(12) United States Patent
Izuno et al.

(10) Patent No.: US 8,182,343 B2
(45) Date of Patent: May 22, 2012

(54) GAME APPARATUS AND STORAGE MEDIUM STORING GAME PROGRAM

(75) Inventors: Toshiharu Izuno, Kyoto (JP); Emi Watanabe, Kyoto (JP); Hiroyuki Takahashi, Shinjuku-ku (JP); Shugo Takahashi, Shinjuku-ku (JP); Ikuo Komiyama, Shinjuku-ku (JP)

(73) Assignee: Nintendo Co., Ltd., Kyoto (JP)

( * ) Notice: Subject to any disclaimer, the term of this patent is extended or adjusted under 35 U.S.C. 154(b) by 582 days.

(21) Appl. No.: 12/400,251

(22) Filed: Mar. 9, 2009

(65) Prior Publication Data
US 2010/0178988 A1     Jul. 15, 2010

(30) Foreign Application Priority Data
Jan. 9, 2009   (JP) ................................ 2009-003624

(51) Int. Cl.
*A63F 13/00*     (2006.01)
*A63F 9/24*     (2006.01)
*G06F 17/00*     (2006.01)
*G06F 19/00*     (2011.01)

(52) U.S. Cl. .......................................... 463/37; 463/43
(58) Field of Classification Search ...................... 463/37
See application file for complete search history.

(56) References Cited

U.S. PATENT DOCUMENTS
7,988,558 B2 *   8/2011   Sato ................................ 463/37
2007/0270219 A1 *   11/2007   Sugioka et al. ................. 463/37

FOREIGN PATENT DOCUMENTS
JP     2007-241655     9/2007

* cited by examiner

*Primary Examiner* — Thien F Tran
(74) *Attorney, Agent, or Firm* — Nixon & Vanderhye P.C.

(57) ABSTRACT

Provided is a game apparatus performing game processing using acceleration data outputted from an acceleration sensor that detects acceleration in directions of at least two axes with respect to an input device. Range setting means sets, for determining first acceleration relating to at least one axis among the at least two axes, a plurality of determination ranges for the first acceleration. Range control means changes, by using the acceleration data, at least one of the determination ranges according to second acceleration relating to at least one axis among the at least two axes, the at least one axis including at least a different axis from the at least one axis relating to the first acceleration. Determination means determines which determination range includes the first acceleration indicated by the acceleration data. Came processing means performs game processing according to a determination result provided by the determination means.

18 Claims, 23 Drawing Sheets

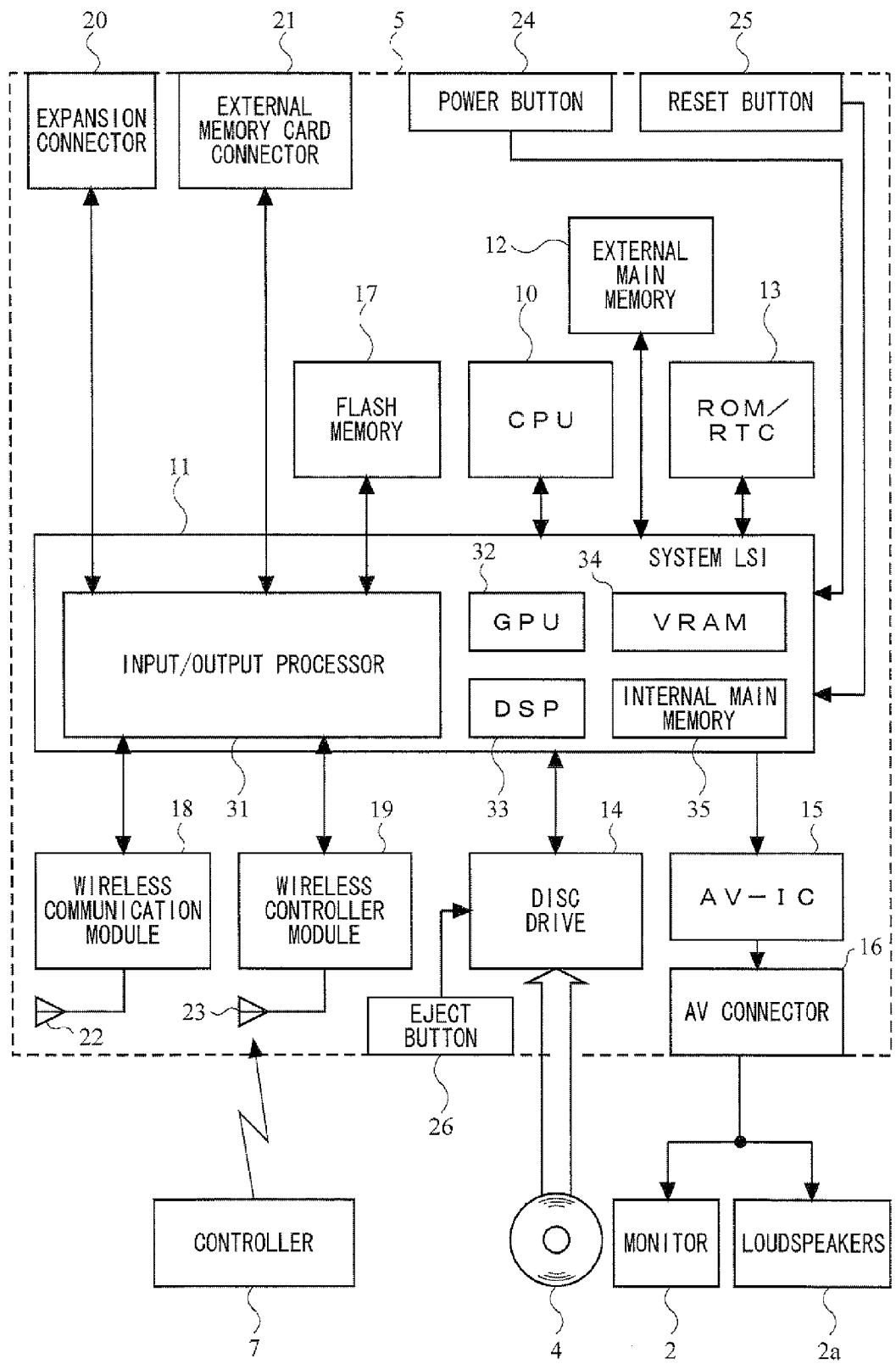
F I G. 2

F I G. 7
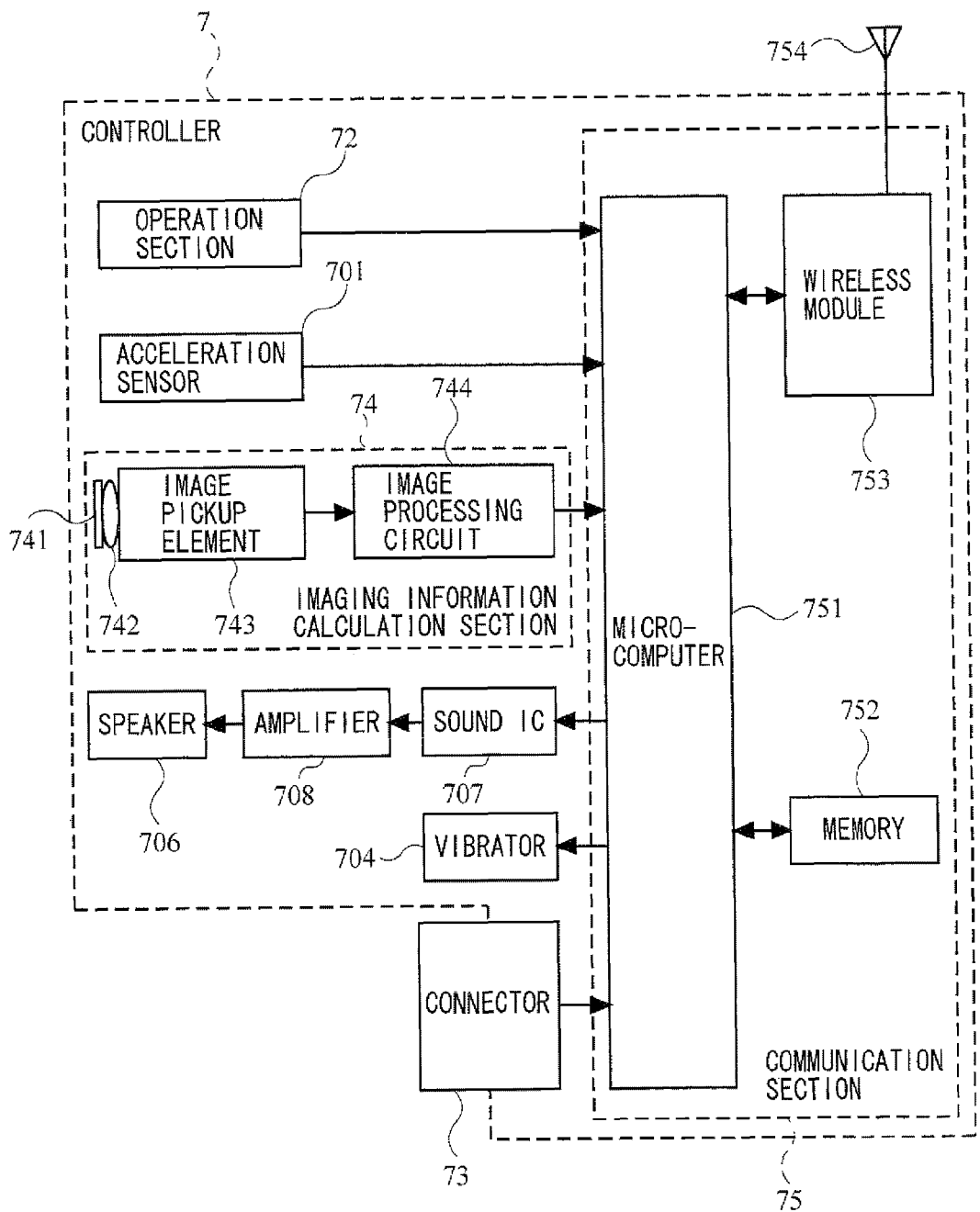

FIG. 10A
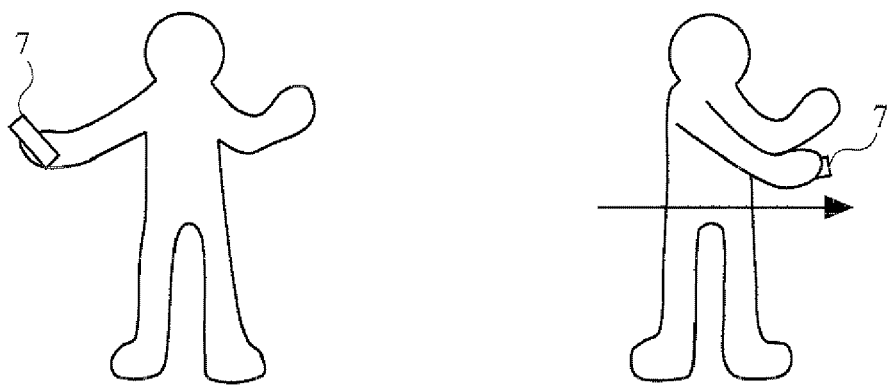
FLAT SHOT
FIG. 10B
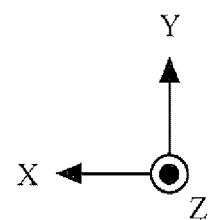

TOPSPIN SHOT

SLICE SPIN SHOT

FIG. 13A
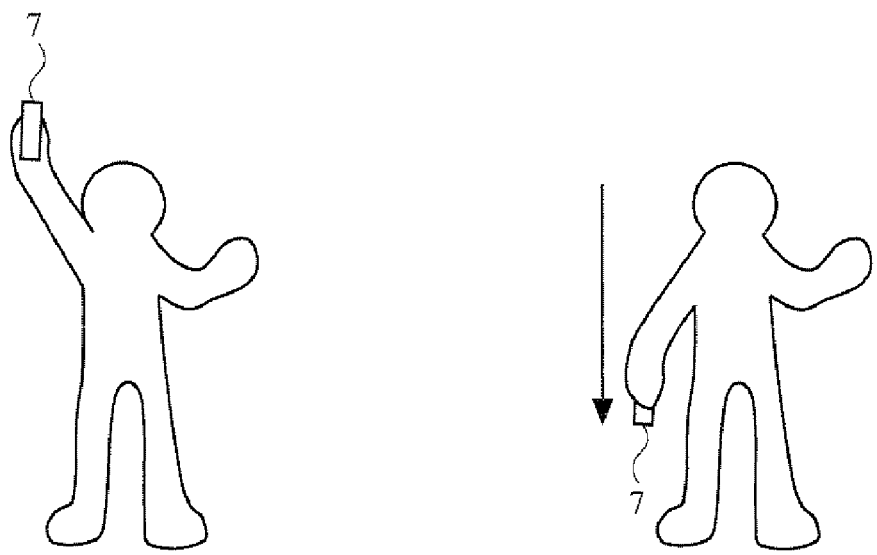
DROP SHOT
(SMASH SHOT)
FIG. 13B
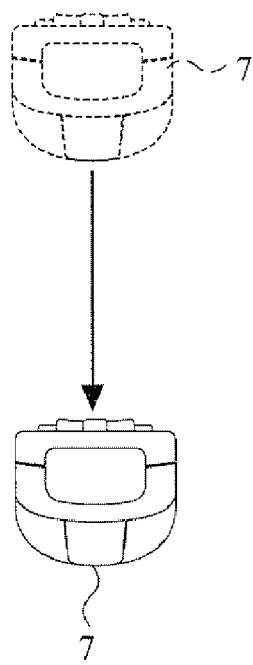
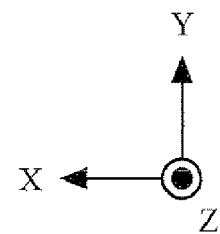

FIG. 14A
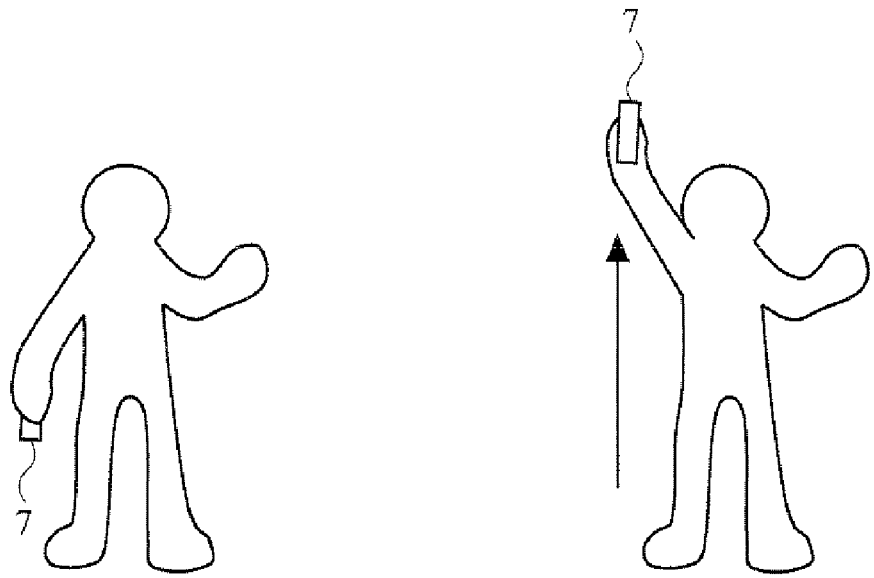
LOB SHOT
FIG. 14B
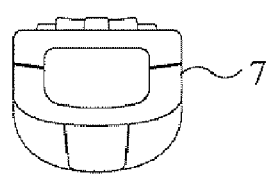
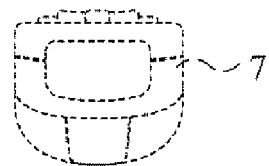
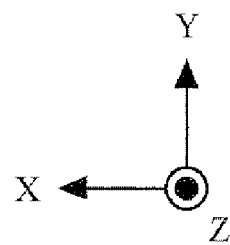

F I G. 19
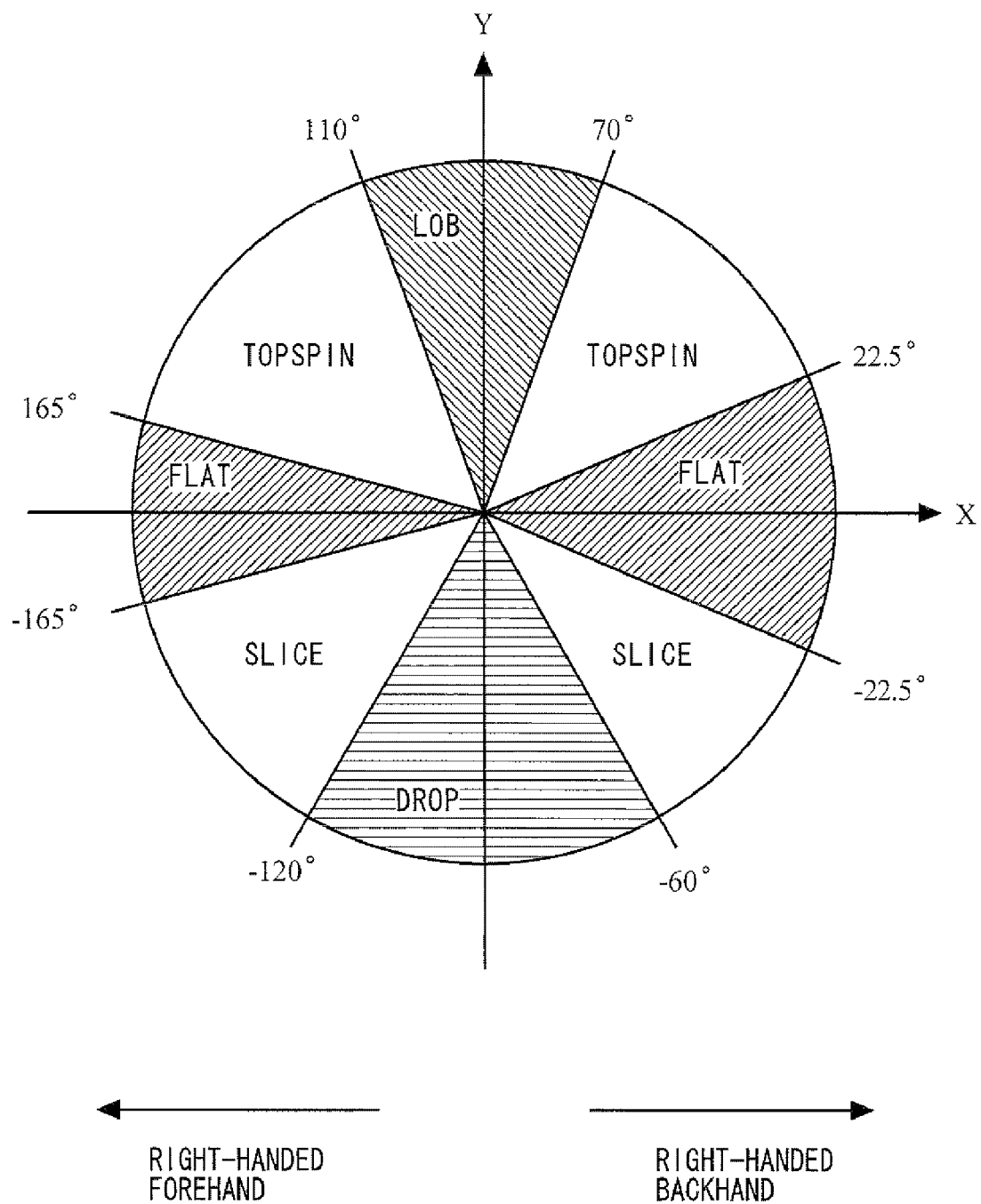

F I G. 2 1
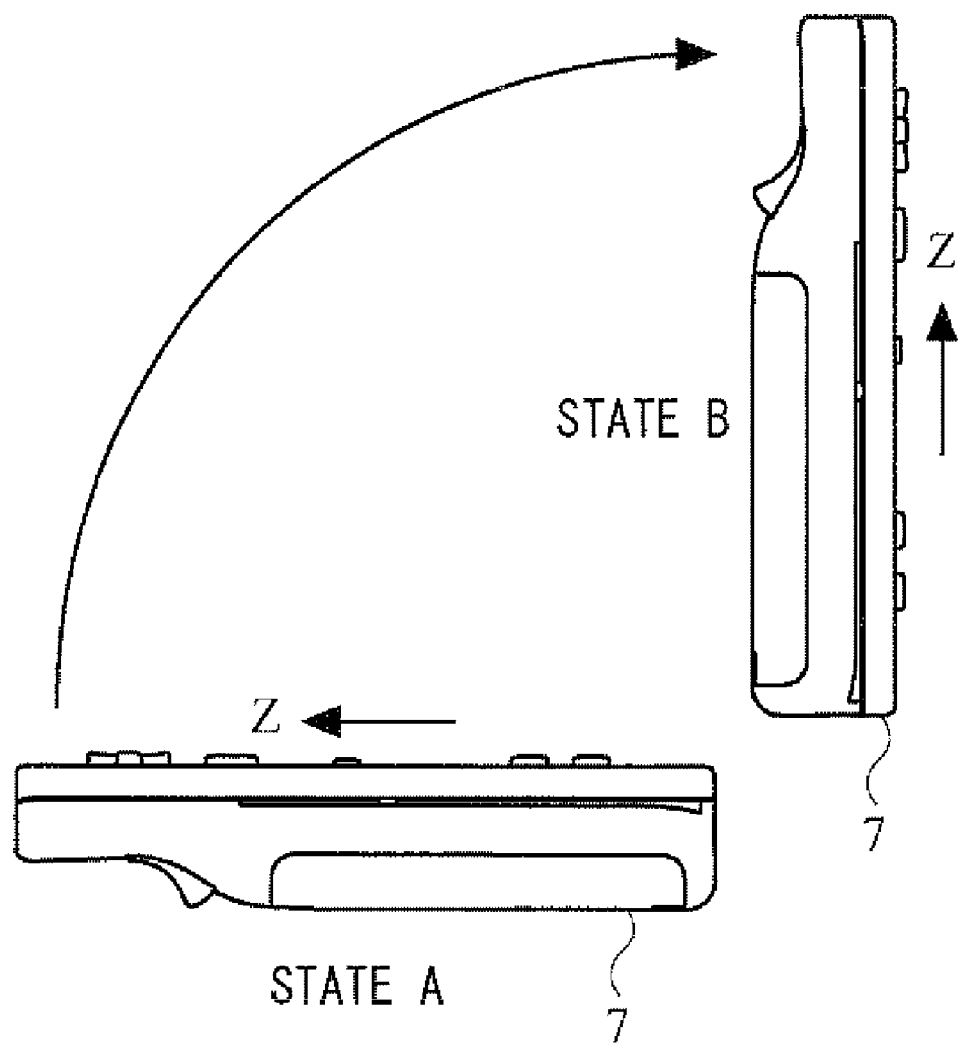

GAME APPARATUS AND STORAGE MEDIUM STORING GAME PROGRAM

CROSS REFERENCE TO RELATED APPLICATION

The disclosure of Japanese Patent Application No. 2009-003624, filed Jan. 9, 2009, is incorporated herein by reference.

BACKGROUND OF THE INVENTION

1. Field of the Invention

The present invention relates to a game apparatus and a storage medium storing a game program. The present invention particularly relates to a game apparatus and a storage medium storing a game program, which perform game processing based on acceleration.

2. Description of the Background Art

Conventionally, as disclosed in, e.g., Japanese Laid-Open Patent Publication No. 2007-241655 (hereinafter, referred to as Patent Document 1), there are game apparatuses that perform game processing using acceleration data outputted from an acceleration sensor included in an input device (see Patent Document 1). A movement determination apparatus disclosed in Patent Document 1 determines a moving direction of an input device, based on transition in acceleration data outputted from an acceleration sensor.

However, in the case of using the movement determination apparatus to determine a direction in which the input device has been swung, determination for various types of swings cannot be performed by single determination processing. For example, in the case of playing a tennis game in a virtual game world by swinging the input device, the above movement determination apparatus is not intended to realize a shot in accordance with an actual tennis swing although, in actual tennis play, various types of shots can be hit with different racket swing directions. Also, in the case of performing operations by swinging the input device, there is often a desire to perform different operations by changing a swing strength or the like even when performing the operations with a same swing direction. However, if such swing operations are determined only based on fixed swing directions, the above differences in the operations cannot be distinguished.

SUMMARY OF THE INVENTION

Therefore, an object of the present invention is to provide a game apparatus and a storage medium storing a game program, which are able to select and perform appropriate game processing in a game where game processing is performed based on acceleration.

The present invention has the following features to achieve the object mentioned above. Note that reference numerals, step numbers and the like indicated between parentheses are merely provided to facilitate the understanding of the present invention in relation to the later-described embodiment, rather than limiting the scope of the present invention in any way.

A first aspect of the present invention is a game apparatus (5) performing game processing by using acceleration data (Da) outputted from an acceleration sensor (701) that is capable of detecting acceleration in directions of at least two axes with respect to an input device (7). The game apparatus comprises: obtaining means (a CPU 10 performing steps 43, 44, 63 and 64; hereinafter, only step numbers are indicated); range setting means (Dh, FIGS. 19 and 20); range control means (S89 to 91); determination means (S88 and S91); and game processing means (S51). The obtaining means obtains the acceleration data from the input device. The range setting means sets, in order to determine first acceleration (X- and Y-axis components of a vector sum) relating to at least one axis (X-axis, Y-axis) among the at least two axes (X-axis, Y-axis, Z-axis), a plurality of determination ranges for the first acceleration. The range control means changes, by using the acceleration data, at least one of the plurality of determination ranges in accordance with second acceleration relating to at least one axis among the at least two axes, the at least one axis including at least a different axis from the at least one axis relating to the first acceleration; (i.e., in accordance with a Z-axis component of the vector sum). The determination means determines which of the plurality of determination ranges includes the first acceleration indicated by the acceleration data. The game processing means performs game processing in accordance with a determination result provided by the determination means.

In a second aspect of the present invention based on the above first aspect, the acceleration sensor detects acceleration in directions of three axes with respect to the input device. The first acceleration relates to two axes among the three axes. The second acceleration relates to a remaining one of the three axes, which is different from the two axes. When the first acceleration is a two-dimensional vector relating to the two axes, the range setting means sets the plurality of determination ranges with respect to a direction (θ) of the two-dimensional vector.

In a third aspect of the present invention based on the above second aspect, when acceleration relating to the remaining one axis, which acceleration is indicated by the acceleration data, is less than a predetermined value (Tb), the range control means significantly changes at least one of the plurality of determination ranges (lob shot).

In a fourth aspect of the present invention based on the above third aspect, the range setting means sets the plurality of determination ranges respectively for operation descriptions (shot types) that are set so as to respectively correspond to directions in which the input device is swung. The game processing means executes, as the game processing, a tennis game in which a player character (PC) appearing in a virtual game world is caused to perform swings in accordance with the operation descriptions. The range setting means sets the plurality of determination ranges such that when the input device is swung in an upward direction, one of the operation descriptions, which corresponds to the swing, is a lob shot for hitting a ball (BC) relatively high in the tennis game. When the acceleration relating to the remaining one axis, which is indicated by the acceleration data, is less than the predetermined value, the range control means significantly changes one of the plurality of determination ranges, which is set for the one of the operation descriptions, which indicates the lob shot.

In a fifth aspect of the present invention based on the above first aspect, the game apparatus further comprises motion detection means (S48). The motion detection means detects a time point at which acceleration, which is indicated by the acceleration data and which relates to at least one axis among the at least two axes, has become a value equal to or greater than a predetermined value (Ta). The determination means performs determination on the first acceleration, by using a history of the acceleration data (h0 to h4) obtained during a predetermined period that is set with reference to the time point detected by the motion detection means.

In a sixth aspect of the present invention based on the above first aspect, in response to the determination result provided by the determination means, the game processing means selects and performs, from among a plurality of types of game processing (swing types), one type of game processing that is set corresponding to one of the plurality of determination ranges, which includes the first acceleration.

In a seventh aspect of the present invention cased on the above sixth aspect, the range setting means sets the plurality of determination ranges respectively for operation descriptions that are set so as to respectively correspond to motions of the input device. The game processing means performs game processing in accordance with one of the operation descriptions, which is set corresponding to one of the plurality of determination ranges, which includes the first acceleration.

In an eighth aspect of the present invention based on the above seventh aspect, the game processing means performs game processing that causes a player character appearing in a virtual game world to perform a swing in accordance with the one of the operation descriptions.

In a ninth aspect of the present invention based on the above first aspect, the determination means recognizes a direction, in which the first acceleration has occurred, to be a direction in which the input device has moved, and determines one of the plurality of determination ranges, which includes the direction. The range setting means sets the plurality of determination ranges respectively for operation descriptions that are set so as to respectively correspond to moving directions of the input device. When a magnitude of the second acceleration is less than a predetermined value, the range control means significantly changes at least one of the plurality of determination ranges.

A tenth aspect of the present invention is a computer-readable storage medium storing a game program to be executed by a computer (10) of a game apparatus that performs game processing by using acceleration data outputted from an acceleration sensor that is capable of detecting acceleration in directions of at least two axes with respect to an input device. The game program causes the computer to act as: obtaining means, range setting means, range control means, determination means and game processing means. The obtaining means obtains the acceleration data from the input device. The range setting means sets, in order to determine first acceleration relating to at least one axis among the at least two axes, a plurality of determination ranges for the first acceleration. The range control means changes, by using the acceleration data, at least one of the plurality of determination ranges in accordance with second acceleration relating to at least one axis among the at least two axes, the at least one axis including at least a different axis from the at least one axis relating to the first acceleration. The determination means determines which of the plurality of determination ranges includes the first acceleration indicated by the acceleration data. The game processing means performs game processing in accordance with a determination result provided by the determination means.

In an eleventh aspect of the present invention based on the above tenth aspect, the acceleration sensor detects acceleration in directions of three axes with respect to the input device. The first acceleration relates to two axes among the three axes. The second acceleration relates to a remaining one of the three axes, which is different from the two axes. When the first acceleration is a two-dimensional vector relating to the two axes, the range setting means sets the plurality of determination ranges with respect to a direction of the two-dimensional vector.

In a twelfth aspect of the present invention based on the above eleventh aspect, when acceleration relating to the remaining one axis, which acceleration is indicated by the acceleration data, is smaller than a predetermined value, the range control means significantly changes at least one of the plurality of determination ranges.

In a thirteenth aspect of the present invention based on the above twelfth aspect, the range setting means sets the plurality of determination ranges respectively for operation descriptions that are set so as to respectively correspond to directions in which the input device is swung. The game processing means executes, as the game processing, a tennis game in which a player character appearing in a virtual game world is caused to perform swings in accordance with the operation descriptions. The range setting means sets the plurality of determination ranges such that when the input device is swung in an upward direction, one of the operation descriptions, which corresponds to the swing, is a lob shot for hitting a ball relatively high in the tennis game. When the acceleration relating to the remaining one axis, which is indicated by the acceleration data, is less than the predetermined value, the range control means significantly changes one of the plurality of determination ranges, which is set for the one of the operation descriptions, which indicates the lob shot.

In a fourteenth aspect of the present invention based on the above tenth aspect, the game program further causes the computer to act as motion detection means. The motion detection means detects a time point at which acceleration, which is indicated by the acceleration data and which relates to at least one axis among the at least two axes, has become a value equal to or greater than a predetermined value. The determination means performs determination on the first acceleration, by using a history of the acceleration data obtained during a predetermined period that is set with reference to the time point detected by the motion detection means.

In a fifteenth aspect of the present invention based on the above tenth aspect, in response to the determination result provided by the determination means, the game processing means selects and performs, from among a plurality of types of game processing, one type of game processing that is set corresponding to one of the plurality of determination ranges, which includes the first acceleration.

In a sixteenth aspect of the present invention based on the above fifteenth aspect, the range setting means sets the plurality of determination ranges respectively for operation descriptions that are set so as to respectively correspond to motions of the input device. The game processing means performs game processing in accordance with one of the operation descriptions, which is set corresponding to one of the plurality of determination ranges, which includes the first acceleration.

In a seventeenth aspect of the present invention based on the above sixteenth aspect, the game processing means performs game processing that causes a player character appearing in a virtual game world to perform a swing in accordance with the one of the operation descriptions.

In an eighteenth aspect of the present invention based on the above tenth aspect, the determination means recognizes a direction, in which the first acceleration has occurred, to be a direction in which the input device has moved, and determines one of the plurality of determination ranges, which includes the direction. The range setting means sets the plurality of determination ranges respectively for operation descriptions that are set so as to respectively correspond to moving directions of the input device. When a magnitude of the second acceleration is less than a predetermined value, the range control means significantly changes at least one of the plurality of determination ranges.

According to the above first aspect, even if first accelerations are the same, different determinations can be provided based on values of second accelerations. This makes it possible to provide more detailed determination. Consequently, the game processing, which is properly based on operations intended by the player, is realized.

In the above second aspect, the determination ranges, with which the two-dimensional vector is determined using the components of the two axes (e.g., X- and Y-axes) of the three-axis (e.g., X-, Y- and Z-axes) direction acceleration obtained from the acceleration sensor, are changed based on a value of the component of the one axis (e.g., Z-axis) that is different from the above two axes. As a result, for example, in the case of determining, based on the two-dimensional vector, a direction in which the input device has moved, even if movements of the input device are in same directions, the movements can be determined to be different operations from each other, based on the moving manner, moving speed or the like. This makes it possible to provide more detailed determination. Consequently, the game processing, which is properly based on operations intended by the player, is realized.

According to the above third aspect, in the case where acceleration, which occurs in a direction of the one axis (e.g., Z-axis) different from the two axes, is small, a particular determination range is expanded. In other words, if the input device moves such that the acceleration in the direction of the one axis is relatively small, there is a high possibility of determining that the acceleration is included in the particular determination range. Consequently, the game processing, which is properly based on operations intended by the player, is realized.

According to the above fourth aspect, in the case where the player has performed an operation to swing the input device upward in the tennis game, if the acceleration relating to the one axis, which is different from the two axes (e.g., X- and Y-axes) used for detecting a swing direction of the input device, is relatively small, there is a high possibility of determining that an operation indicating a so-called lob shot has been performed.

According to the above fifth aspect, arrival of a time point, at which a certain amount of motion of the input device has occurred, triggers determination that is performed using a history of accelerations having occurred during a predetermined period. Accordingly, an operation based on the motion of the input device at the above time point can be determined, and also, the determination can be performed accurately by using tendency for the accelerations during the above predetermined period.

According to the above sixth aspect, different types of game processing can be performed depending on the determination result.

According to the above seventh aspect, game processing according to an operation description indicated by the determination result can be performed.

According to the above eight aspect, the player character can be caused to perform a swing in accordance with the operation description indicated by the determination result.

According to the above ninth aspect, even if movements of the input device are in same directions, the movements can be determined to be different operations from each other, based on the moving manner, moving speed or the like. This makes it possible to provide more detailed determination. Consequently, the game processing, which is properly based on operations intended by the player, is realized.

According to the storage medium storing the game program of the present invention, the same effects as those of the above described game apparatus can be obtained.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a functional block diagram of a game apparatus body 5 of FIG. 1;

FIG. 7 is a block diagram showing a configuration of the controller 7 of FIG. 3;

FIG. 10A shows an example of a motion of the player holding the controller 7 and performing a flat shot in a tennis game;

FIG. 10B shows an example of a motion of the controller 7 in the case where the player performs a flat shot;

FIG. 13A shows an example of a motion of the player holding the controller 7 and performing a drop shot or a smash shot in the tennis game;

FIG. 13B shows an example of a motion of the controller 7 in the case where the player performs a drop shot or a smash shot;

FIG. 14A shows an example of a motion of the player holding the controller 7 and performing a lob shot in the tennis game;

FIG. 14B shows an example of a motion of the controller 7 in the case where the player performs a lob shot;

FIG. 19 shows an example of swing angle determination ranges used in the swing determination process;

FIG. 21 shows an example of a change in a state of the controller 7 from a state where an upper surface of the controller 7 faces upward to a state where a front surface of the controller 7 faces upward;

DESCRIPTION OF THE PREFERRED EMBODIMENTS

Figure 1:
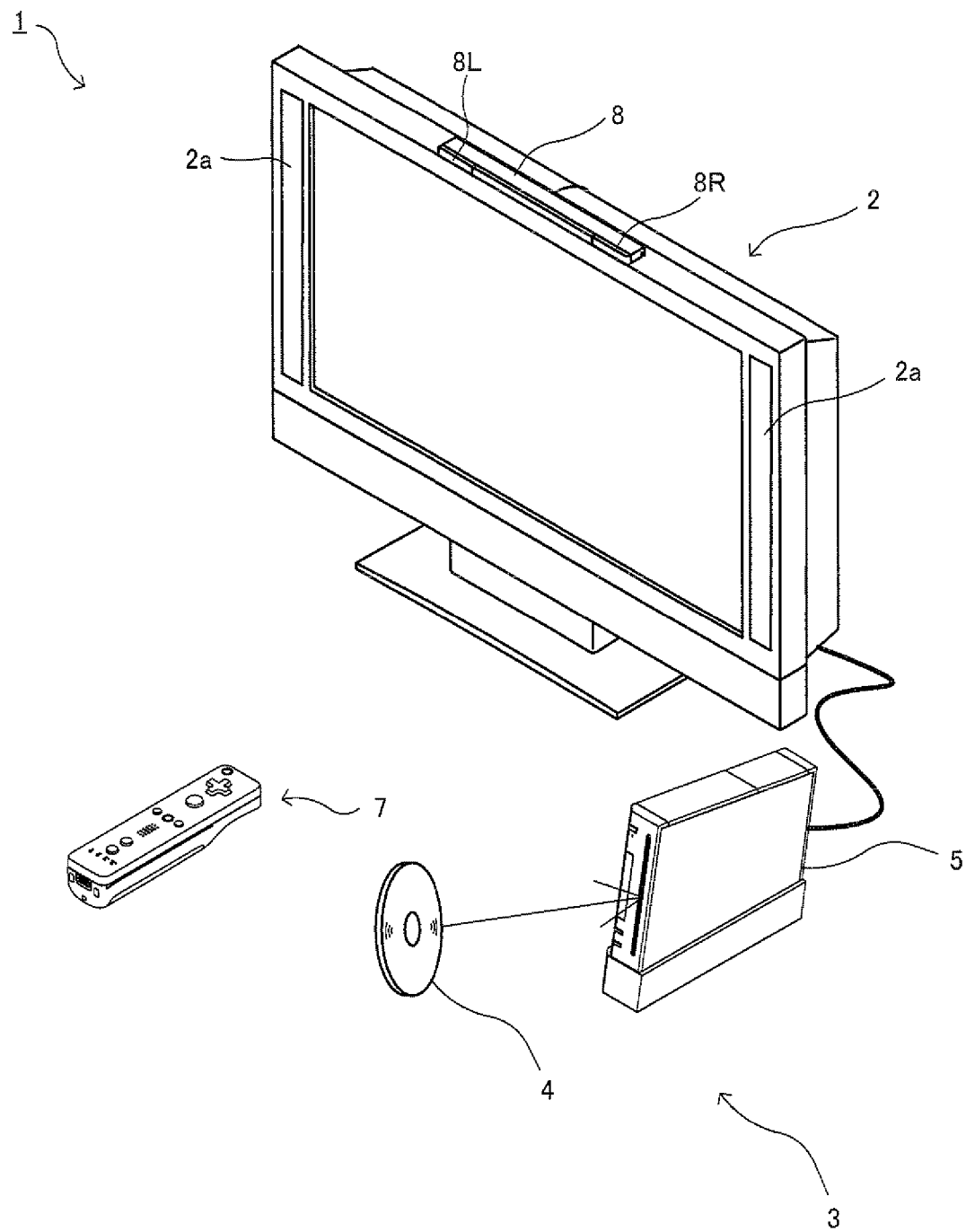
FIG. 1 is an external view illustrating a game system 1 according to an embodiment of the present invention.

With reference to FIG. 1, an apparatus for executing a game program according to an embodiment of the present invention will be described. Hereinafter, in order to give a specific description, a game system including a stationary game apparatus body 5 that is an example of the above apparatus will be described. FIG. 1 is an external view illustrating a game system 1 including a stationary game apparatus 3. FIG. 2 is a block diagram of the game apparatus body 5. The game system 1 will be described below.

As shown in FIG. 1, the game system 1 includes: a home-use TV receiver 2 (hereinafter, referred to as a monitor 2) which is an example of display means; and the stationary game apparatus 3 connected to the monitor 2 via a connection cord. The monitor 2 has loudspeakers 2a for outputting, in the form of sound, an audio signal outputted from the game apparatus 3. The game apparatus 3 includes: an optical disc 4 storing a program that is an example of a game program of the present invention; the game apparatus body 5 having a computer for executing the game program of the optical disc 4 to cause the monitor 2 to output and display a game screen; and a controller 7 for providing the game apparatus body 5 with necessary operation information for a game in which a character or the like displayed in the game screen is controlled.

The game apparatus body 5 has a wireless controller module 19 therein (see FIG. 2). The wireless controller module 19 receives data wirelessly transmitted from the controller 7, and transmits data from the game apparatus body 5 to the controller 7. In this manner, the controller 7 and the game apparatus body 5 are connected by radio communication. Further, the optical disc 4 as an example of an exchangeable information storage medium is detachably mounted on the game apparatus body 5.

On the game apparatus body 5, a flash memory 17 (see FIG. 2) is mounted, the flash memory 17 functioning as a backup memory for fixedly storing data, e.g., saved data. The game apparatus body 5 executes the game program or the like stored on the optical disc 4, and displays a result thereof as a game image on the monitor 2. The game program or the like to be executed may be prestored not only on the optical disc 4, but also in the flash memory 17. The game apparatus body 5 can reproduce a state of the game played in the past, by using the saved data stored in the flash memory 17, and display a game image of the reproduced state on the monitor 2. A player playing with the game apparatus 3 can enjoy advancing in the game by operating the controller 7 while watching the game image displayed on the monitor 2.

By using the technology of, for example, Bluetooth (registered trademark), the controller 7 wirelessly transmits transmission data, such as operation information, to the game apparatus body 5 having the wireless controller module 19 therein. The controller 7 is operation means mainly for controlling a player object or the like displayed on a display screen of the monitor 2. The controller 7 has a housing, which is small enough to be held by one hand, and a plurality of operation buttons (including a cross key, a stick or the like) exposed at a surface of the housing. As described later in detail, the controller 7 includes an imaging information calculation section 74 for taking an image of a view seen from the controller 7. As exemplary imaging targets of the imaging information calculation section 74, two LED modules 8L and 8R (thereinafter, referred to as "markers 8L and 8R") are provided in the vicinity of the display screen of the monitor 2. The markers 8L and 8R each output, e.g., an infrared light forward from the monitor 2. The controller 7 is capable of receiving, at a communication section 75, transmission data wirelessly transmitted from the wireless controller module 19 of the game apparatus body 5, and generating a sound or vibration based on the transmission data.

Next, an internal configuration of the game apparatus body 5 will be described with reference to FIG. 2. FIG. 2 is a block diagram showing the internal configuration of the game apparatus body 5. The game apparatus body 5 has a CPU (Central Processing Unit) 10, a system LSI (Large Scale Integration) 11, an external main memory 12, a ROM/RTC (Read Only Memory/Real Time Clock) 13, a disc drive 14, an AV-IC (Audio Video-Integrated Circuit) 15, and the like.

The CPU 10 performs game processing by executing the game program stored in the optical disc 4, and acts as a game processor. The CPU 10 is connected to the system LSI 11. In addition to the CPU 10, the external main memory 12, the ROM/RTC 13, the disc drive 14 and the AV-IC 15 are connected to the system LSI 11. The system LSI 11 performs processing such as: controlling data transfer among components connected to the system. LSI 11; generating an image to be displayed; obtaining data from external devices; and the like. An internal configuration of the system LSI 11 will be described later. The external main memory 12 that is a volatile memory stores a program, for example, the game program loaded from the optical disc 4, or the game program loaded from the flash memory 17, and also stores various data. The external main memory 12 is used as a work area or buffer area of the CPU 10. The ROM/RTC 13 has a ROM in which a boot program for the game apparatus body 5 is incorporated (so-called a boot ROM), and has a clock circuit (RTC) which counts the time. The disc drive 14 reads program data, texture data and the like from the optical disc 4, and writes the read data into a later-described internal main memory 35 or into the external main memory 12.

On the system LSI 11, an input/output processor 31, a GPU (Graphic Processor Unit) 32, a DSP (Digital Signal Processor) 33, a VRAM (Video RAM) 34 and the internal main memory 35 are provided. Although not shown, these components 31 to 35 are connected to each other via an internal bus.

The GPU 32 constitutes a part of rendering means, and generates an image in accordance with a graphics command from the CPU 10. The VRAM 34 stores necessary data for the GPU 32 to execute the graphics command (data such as polygon data, texture data and the like) At the time of generating the image, the CPU 32 uses the data stored in the VRAM 34, thereby generating image data.

The DSP 33 acts as an audio processor, and generates audio data by using sound data and sound waveform (tone) data stored in the internal main memory 35 and the external main memory 12.

The image data and the audio data generated in the above manner are read by the AV-IC 15. The AV-IC 15 outputs the read image data to the monitor 2 via the AV connector 16, and outputs the read audio data to the loudspeakers 2a embedded in the monitor 2. As a result, an image is displayed on the monitor 2 and a sound is outputted from the loudspeakers 2a.

The input/output processor (I/O Processor) 31 performs data transmission/reception to/from components connected thereto, and downloads data from external devices, for example. The input/output processor 31 is connected to the flash memory 17, a wireless communication module 18, the wireless controller module 19, an expansion connector 20 and an external memory card connector 21. An antenna 22 is connected to the wireless communication module 18, and an antenna 23 is connected to the wireless controller module 19.

The input/output processor 31 is connected to a network via the wireless communication module 18 and the antenna 22 so as to be able to communicate with other game apparatuses an various servers connected to the network. The input/output processor 31 regularly accesses the in flash memory 17 to detect presence or absence of data that is required to be transmitted to the network. If such data is present, the data is transmitted to the network via the wireless communication module 18 and the antenna 22. Also, the input/output processor 31 receives, via the network, the antenna 22 and the wireless communication module 18, data transmitted from other game apparatuses or data downloaded from a download server, and stores the received data in the flash memory 17. By executing the game program, the CPU 10 reads the data stored in the flash memory 17 to use the data in the game program. In addition to the data transmitted and received between the game apparatus body 5 and other game apparatuses or various servers, the flash memory 17 may store saved data of a game that is played using the game apparatus body 5 (such as result data or progress data of the game).

Further, the input/output processor 31 receives, via the antenna 23 and the wireless controller module 19, operation data or the like transmitted from the controller 7, and stores (temporarily) the operation data or the like in a buffer area of the internal main memory 35 or the external main memory 12. Note that, similarly to the external main memory 12, the internal main memory 35 may store a program, for example, the game program loaded from the optical disc 4 or the game program loaded from the flash memory 17, and also store various data. The internal main memory 35 may be used as a work area or buffer area of the CPU 10.

In addition, the expansion connector 20 and the external memory card connector 21 are connected to the input/output processor 31. The expansion connector 20 is a connector for such interface as USB, SCSI or the like. The expansion connector 20, instead of the wireless communication module 18, is able to perform communications with a network by being connected to such a medium as an external storage medium, to such a peripheral device as another controller, or to a connector for wired communication. The external memory card connector 21 is a connector to be connected to an external storage medium such as a memory card. For example, the input/output processor 31 is able to access the external storage medium via the expansion connector 20 or the external memory card connector 21 to store or read data from the external storage medium.

On the game apparatus body 5 (e.g., on a front main surface), a power button 24 of the game apparatus body 5, a reset button 25 for resetting game processing, an insertion slot for mounting the optical disc 4 in a detachable manner, an eject button 26 for ejecting the optical disc 4 from the insertion slot of the game apparatus body 5, and the like are provided. The power button 24 and the reset button 25 are connected to the system LSI 11. When the power button 24 is turned on, each component of the game apparatus body 5 is supplied with power via an AC adaptor that is not shown. When the reset button 25 is pressed, the system LSI 11 reexecutes the boot program of the game apparatus body 5. The eject button 26 is connected to the disc drive 14. When the eject button 26 is pressed, the optical disc 4 is ejected from the disc drive 14.

Figure 3:
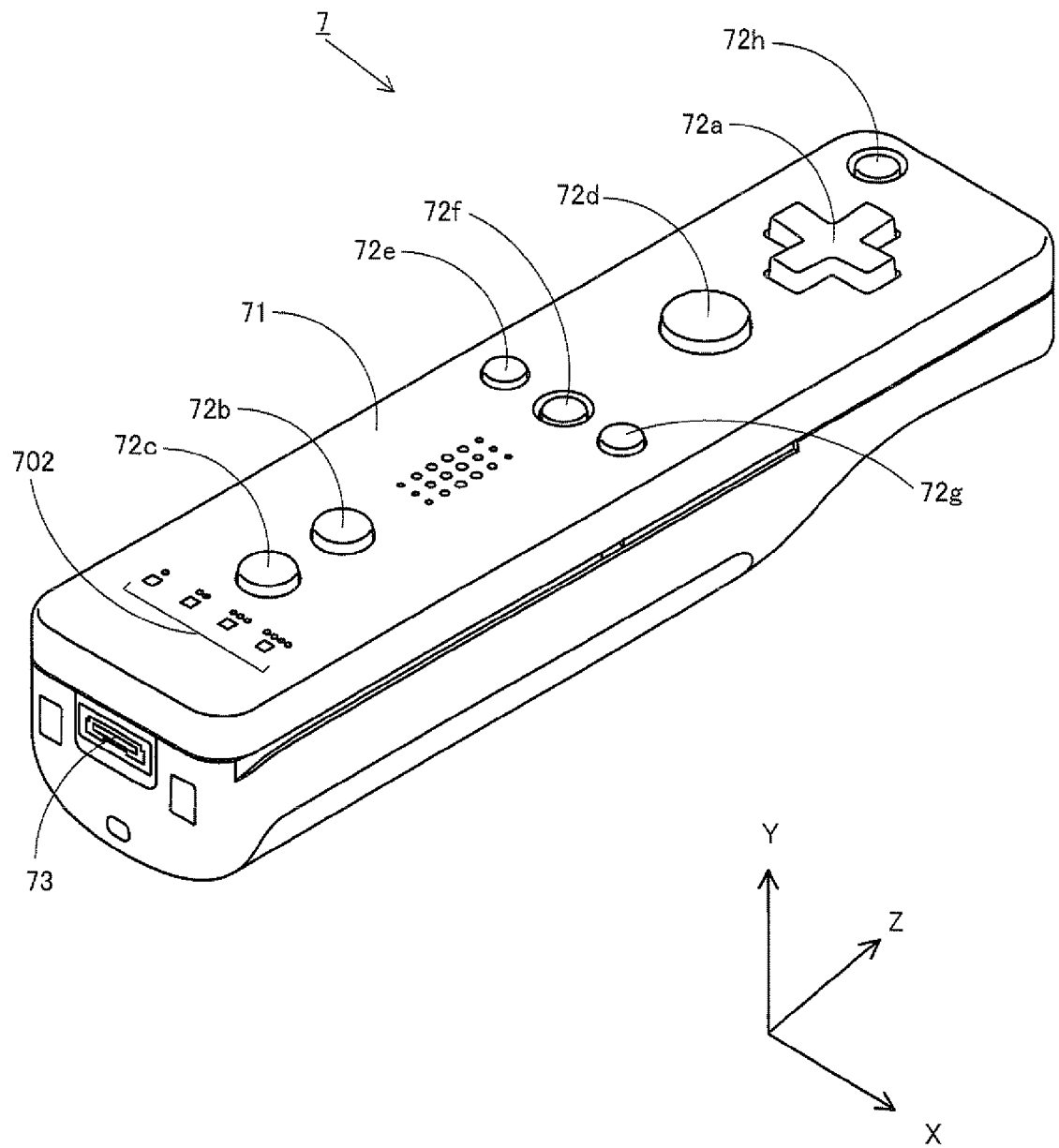
FIG. 3 is an isometric view of the controller 7 of FIG. 1, seen from a top rear side thereof.
Figure 4:
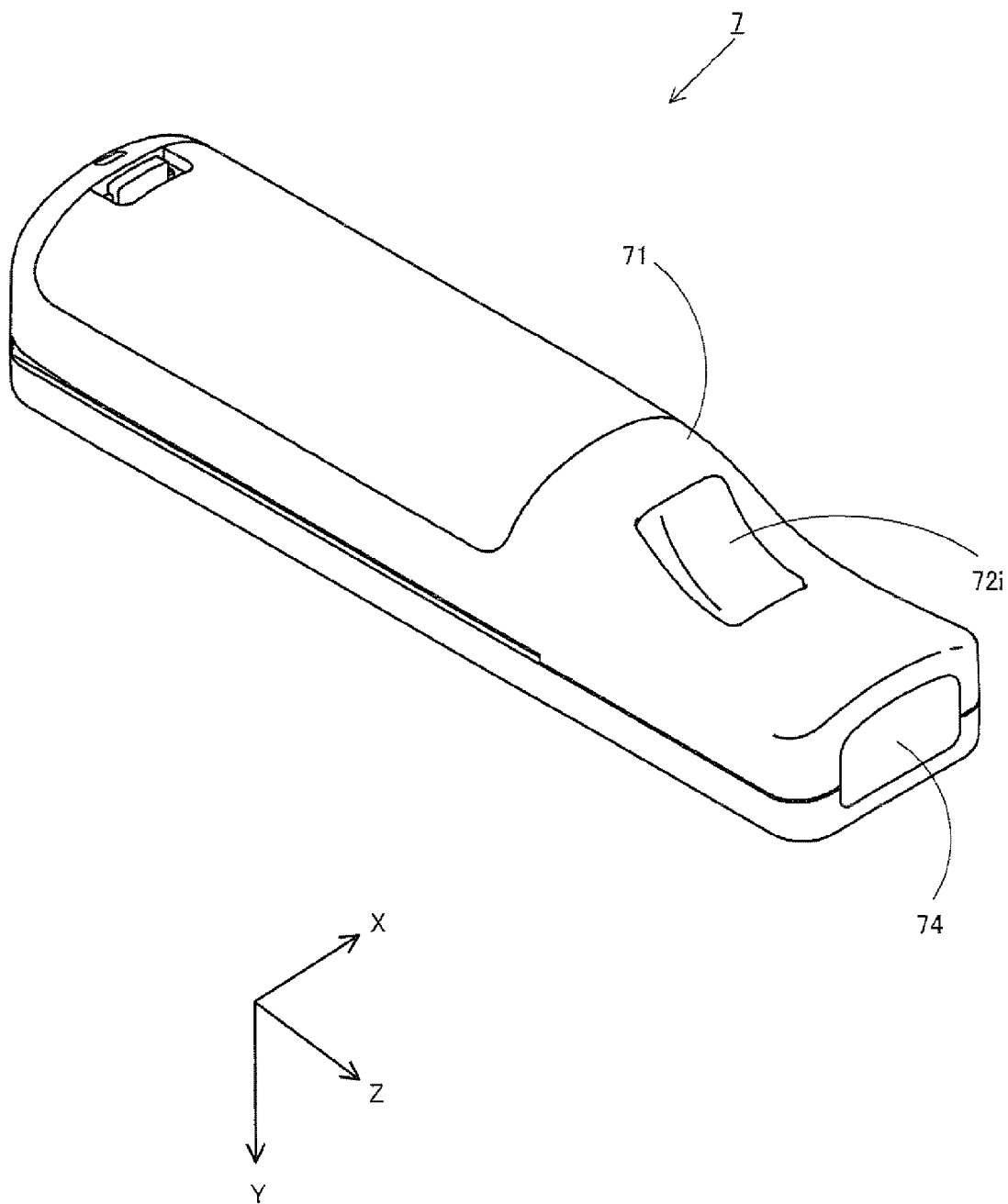
FIG. 4 is an isometric view of the controller 7 of FIG. 3, seen from a bottom front side thereof.

With reference to FIGS. 3 and 4, the controller 7 will be described. FIG. 3 is an isometric view of the controller 7 seen from a top rear side thereof. FIG. 4 is an isometric view of the controller 7 seen from a bottom front side thereof.

As shown in FIGS. 3 and 4, the controller 7 includes a housing 71 formed by plastic molding or the like. The housing 71 has a plurality of operation sections 72 provided thereon. The housing 71 has an approximately parallelepiped shape extending in a longitudinal direction from front to rear. The overall size of the housing 71 is small enough to be held by one hand of an adult or even a child.

At the center of a front part of a top surface of the housing 71, a cross key 72a is provided. The cross key 72a is a cross-shaped four-direction push switch. The cross key 72a includes operation portions corresponding to four directions (front, rear, right and left), which are respectively located on cross-shaped projecting portions arranged at intervals of 90 degrees. A player selects one of the front, rear, right and left directions by pressing one of the operation portions of the cross key 72a. Through an operation of the cross key 72a, the player can, for example, indicate a direction in which a player character or the like appearing in a virtual game world is to move, or give an instruction to select one of a plurality of options.

The cross key 72a is an operation section for outputting an operation signal in accordance with the aforementioned direction input operation performed by the player. Such an operation section may be provided in a different form. For example, an operation section, which has four push switches arranged in crisscross directions and which is capable of outputting an operation signal in accordance with pressing of a push switch by the player, may be provided. Alternatively, an operation section, which has a composite switch having, in addition to the above four push switches, a center switch at an intersection point of the above crisscross directions, may be provided. Still alternatively, the cross key 72a may be replaced with an operation section which includes an inclinable stick (so-called a joy stick) projecting from the top surface of the housing 71 and which outputs an operation signal in accordance with an inclining direction of the stick. Still alternatively, the cross key 72a may be replaced with an operation section which includes a horizontally-slidable disc-shaped member and which outputs an operation signal in accordance with a sliding direction of the disc-shaped member. Still alternatively, the cross key 72a may be replaced with a touch pad.

Behind the cross key 72a on the top surface of the housing 71, a plurality of operation buttons 72b to 72g are provided. The operation buttons 72b to 72g are each an operation section for, when the player presses a head thereof, outputting a corresponding operation signal. For example, functions as a 1st button, a 2nd button and an A button are assigned to the operation buttons 72b to 72d. Also, functions as a minus button, a home button and a plus button are assigned to the operation buttons 72e to 72g, for example. Operation functions are assigned to the respective operation buttons 72a to 72g in accordance with the game program executed by the game apparatus body 5. In an exemplary arrangement shown in FIG. 3, the operation buttons 72b to 72d are arranged in a line at the center on the top surface of the housing 71 in a front-rear direction. The operation buttons 72e to 72g are arranged on the top surface of the housing 71 in a line in a left-right direction between the operation buttons 72b and 72*d*. The operation button 72*f* has a top surface thereof buried in the top surface of the housing 71, so as not to be inadvertently pressed by the player.

In front of the cross key 72*a* on the top surface of the housing 71, an operation button 72*h* is provided. The operation button 72*h* is a power switch for turning on and off the game apparatus body 5 by remote control. The operation button 72*h* also has a top surface thereof buried in the top surface of the housing 71, so as not to be inadvertently pressed by the player.

Behind the operation button 72*c* on the top surface of the housing 71, a plurality of LEDs 702 are provided. Here, a controller type (a number) is assigned to the controller 7 such that the controller 7 is distinguishable from other controllers 7. The LEDs 702 are used for, e.g., informing the player of the controller type currently set for the controller 7. Specifically, a signal is transmitted from the wireless controller module 19 to the controller 7 such that one of the plurality of LEDs 702, which corresponds to the controller type of the controller 7, is lit up.

On the top surface of the housing 71, sound holes for outputting sounds from a later-described speaker (a speaker 706 shown in FIG. 5) to the external space are formed between the operation button 72*b* and the operation buttons 72*e* to 72*g*.

On the bottom surface of the housing 71, a recessed portion is formed. The recessed portion on the bottom surface of the housing 71 is formed in a position in which an index finger or middle finger of the player is located when the player holds the controller 7 with one hand so as to point a front surface thereof to the markers 8L and 8R. On a slope surface of the recessed portion, an operation button 72*i* is provided. The operation button 72*i* is an operation section acting as, for example, a B button.

On a front surface of the housing 71, an image pickup element 743 constituting a part of the imaging information calculation section 74 is provided. The imaging information calculation section 74 is a system for: analyzing image data of an image taken by the controller 7; identifying an area having a high brightness in the image; and detecting a position of the center of gravity, a size and the like of the area. The imaging information calculation section 74 has, for example, a maximum sampling period of approximately 200 frames/sec, and therefore can trace and analyze even a relatively fast motion of the controller 7. A configuration of the imaging information calculation section 74 will be described later in detail. On the rear surface of the housing 71, a connector 73 is provided. The connector 73 is, for example, an edge connector, and is used for engaging and connecting the controller 7 with a connection cable, for example.

In order to give a specific description below, a coordinate system set with respect to the controller 7 will be defined. As shown in FIGS. 3 and 4, an X-axis, a Y-axis and a Z-axis, which are perpendicular to one another, are defined with respect to the controller 7. Specifically, the longitudinal direction of the housing 71, which is the front-rear direction of the controller 7, is defined as a Z-axis, and the longitudinal direction toward the front surface (a surface on which the imaging information calculation section 74 is mounted) of the controller 7 is a Z-axis positive direction. The up-down direction of the controller 7 is defined as a Y-axis, and the up-down direction toward the top surface (a surface on which the operation button 72*a* is provided) of the housing 71 is defined as a Y-axis positive direction. The left-right direction of the controller 7 is defined as an X-axis, and the left-right direction toward the right side surface (a side surface shown in FIG. 3) of the housing 71 is defined as an X-axis positive direction.

Figure 5:
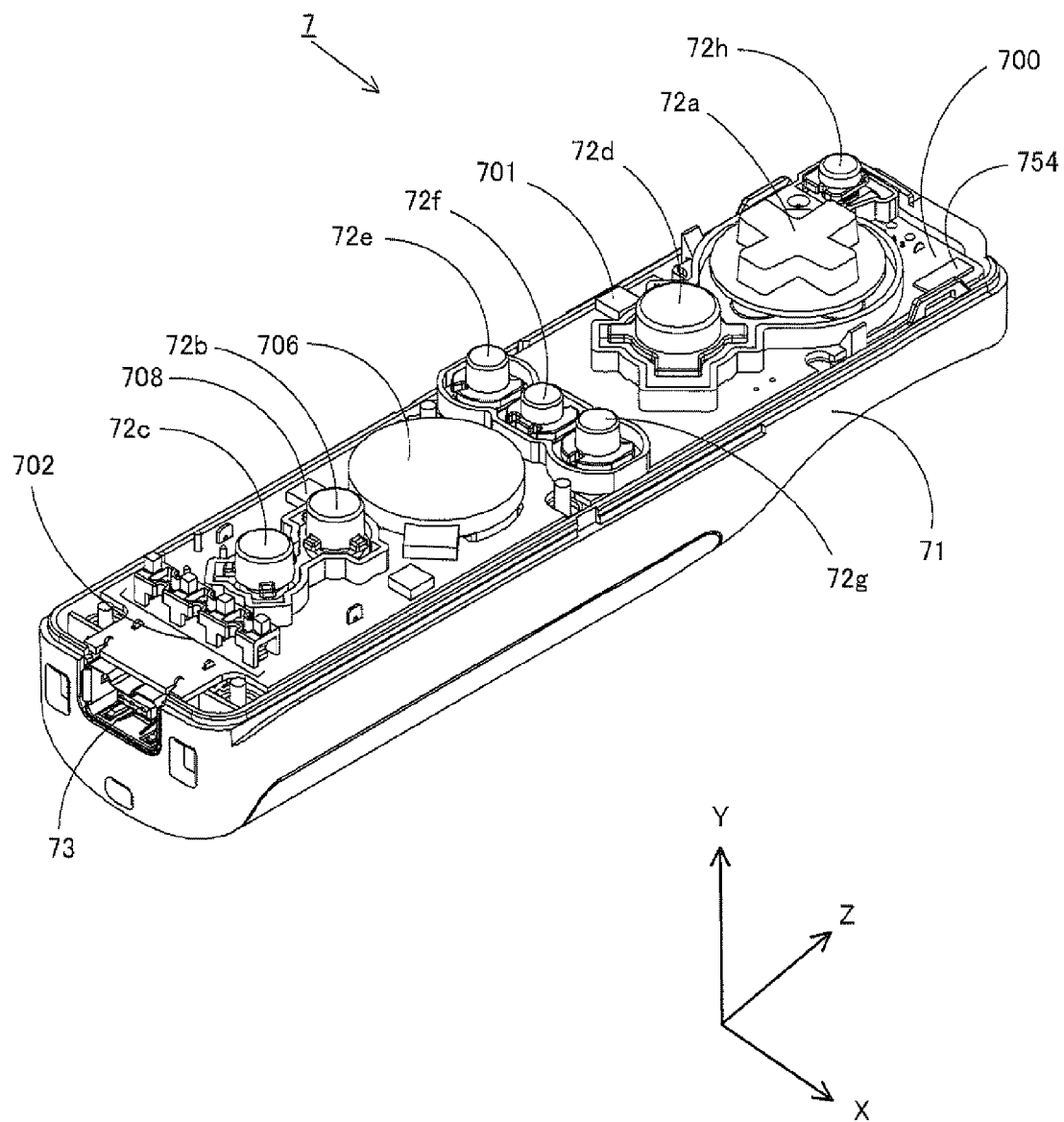
FIG. 5 is an isometric view illustrating that an upper casing of the controller 7 of FIG. 3 is removed.
Figure 6:
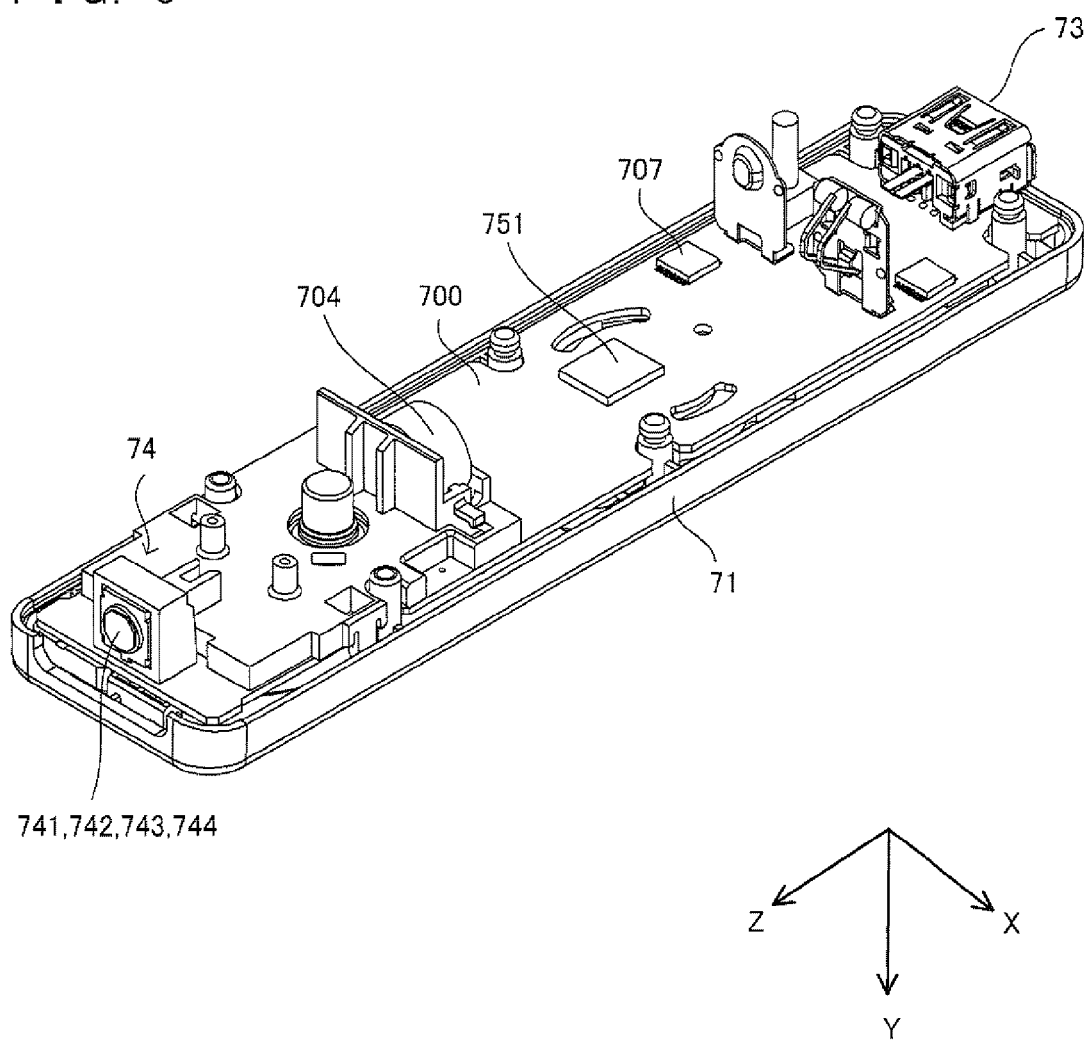
FIG. 6 is an isometric view illustrating that a lower casing of the controller 7 of FIG. 4 is removed.

Next, an internal structure of the controller 7 will be described with reference to FIGS. 5 and 6. FIG. 5 is an isometric view, seen from a rear surface side of the controller 7, illustrating that an upper casing (a part of the housing 71) of the controller 7 is removed. FIG. 6 is an isometric view, seen from a front surface side of the controller 7, illustrating that a lower casing (a part of the housing 71) of the controller 7 is removed. Here, FIG. 6 is an isometric view showing a reverse side of a substrate 700 shown in FIG. 5.

As shown in FIG. 5, the substrate 700 is fixedly provided inside the housing 71. On a top main surface of the substrate 700, the operation buttons 72*a* to 72*h*, an acceleration sensor 701, the LEDs 702, an antenna 754 and the like are provided. These elements are connected to, e.g., a microcomputer 751 (see FIGS. 6 and 7) by wirings (not shown) formed on the substrate 700 and the like. A wireless module 753 (see FIG. 7) and the antenna 754 allow the controller 7 to act as a wireless controller. Inside the housing 71, a quartz oscillator, which is not shown, is provided, and the quarts oscillator generates a reference clock of the later-described microcomputer 751. Further, the speaker 706 and an amplifier 708 are provided on the top main surface of the substrate 700. The acceleration sensor 701 is provided, on the substrate 700, to the left side of the operation button 72*d* (i.e., provided not on a central part but on a peripheral part of the substrate 700). For this reason, in response to the controller 7 having rotated around an axis of the longitudinal direction of the controller 7, the acceleration sensor 701 is able to detect, in addition to a change in a direction of the gravitational acceleration, acceleration containing a centrifugal component, and the game apparatus body 5 or the like is able to determine, based on detected acceleration data, a motion of the controller 7 by a predetermined calculation with a favorable sensitivity.

As shown in FIG. 6, at a front edge of a bottom main surface of the substrate 700, the imaging information calculation section 74 is provided. The imaging information calculation section 74 includes an infrared filter 741, a lens 742, the image pickup element 743 and an image processing circuit 744, which are located in said order from the front surface of the controller 7. These elements are attached to the bottom main surface of the substrate 700. At a rear edge of the bottom main surface of the substrate 700, the connector 73 is attached. Further, a sound IC 707 and the microcomputer 751 are provided on the bottom main surface of the substrate 700. The sound IC 707 is connected to the microcomputer 751 and the amplifier 708 by wirings formed on the substrate 700 and the like, and outputs an audio signal via the amplifier 708 to the speaker 706 in response to sound data transmitted from the game apparatus body 5.

On the bottom main surface of the substrate 700, a vibrator 704 is attached. The vibrator 704 may be, for example, a vibration motor or a solenoid. The vibrator 704 is connected to the microcomputer 751 by wirings formed on the substrate 700 and the like, and is activated or deactivated in response to vibration data transmitted from the game apparatus body 5. The controller 7 is vibrated by an actuation of the vibrator 704, and the vibration is conveyed to the player's hand holding the controller 7. Thus, a so-called vibration-feedback game is realized. Since the vibrator 704 is provided at a relatively forward position in the housing 71, the housing 71 held by the player significantly vibrates, and allows the player to easily feel the vibration.

Next, an internal configuration of the controller 7 will be described with reference to FIG. 7. FIG. 7 is a block diagram showing the configuration of the controller 7.

As shown in FIG. 7, the controller 7 includes the communication section 75 in addition to the above-described operation sections 72, the imaging information calculation section 74, the acceleration sensor 701, the vibrator 704, the speaker 706, the sound IC 707 and the amplifier 708.

The imaging information calculation section 74 includes the infrared filter 741, the lens 742, the image pickup element 743 and the image processing circuit 744. The infrared filter 741 allows, among lights incident thereon through the front surface of the controller 7, only an infrared light to pass therethrough. The lens 742 condenses the infrared light having passed through the infrared filter 741, and outputs the condensed infrared light to the image pickup element 743. The image pickup element 743 is a solid-state image pickup element such as a CMOS sensor, CCD or the Like. The image pickup element 743 takes an image of the infrared light condensed by the lens 742. In other words, the image pickup element 743 takes an image of only the infrared light having passed through the infrared filter 741. Then, the image pickup element 743 generates image data of the image. The image data generated by the image pickup element 743 is processed by the image processing circuit 744. Specifically, the image processing circuit 744 processes the image data obtained from the image pickup element 743, and detects a high brightness area of the image, and outputs, to the communication section 75, process result data indicating results of detecting, e.g., position coordinates, a square measure and the like of the high brightness area. The imaging information calculation section 74 is fixed to the housing 71 of the controller 7. An imaging direction of the imaging information calculation section 74 can be changed by changing a facing direction of the housing 71.

Preferably, the controller 7 includes a triaxial (X-axis, Y-axis, and Z-axis) acceleration sensor 701. The triaxial acceleration sensor 701 detects linear acceleration in three directions, i.e., the up down direction (the Y-axis shown in FIG. 3), the left-right direction (the X-axis shown in FIG. 3) and the front-reardirection (the Z-axis shown in FIG. 3). Alternatively, an accelerometer capable of detecting linear acceleration along with at least two axes may be used. As a non-limiting example, such acceleration sensor 701 may be of the type available from Analog Devices, Inc. or STMicroelectronics N.V. Preferably, the acceleration sensor 701 is an electrostatic capacitance or capacitance-coupling type that is based on silicon micro-machined MEMS (microelectromechanical systems) technology. However, any other suitable accelerometer technology (e.g., piezoelectric type or piezoresistance type) now existing or later developed may be used to provide the acceleration sensor 701.

As one skilled in the art understands, accelerometers, as used in the acceleration sensor 701, are only capable of detecting acceleration along a straight line (linear acceleration) corresponding to each axis of the acceleration sensor 701. In other words, the direct output of the acceleration sensor 701 is limited to signals indicative of linear acceleration (static or dynamic) along the three axes thereof. As a result, the acceleration sensor 701 cannot directly detect movement along a non-linear (e.g. arcuate) path, rotation, rotational movement, angular displacement, tilt, position, orientation or any other physical characteristic.

However, through processing by a computer such as a processor of a game apparatus (e.g. the CPU 10) or a processor of the controller (e.g. the microcomputer 751) based on the linear acceleration signals outputted from the acceleration sensor 701, additional information relating to the controller 7 can be inferred or calculated (determined), as one skilled in the art will readily understand from the description herein.

For example, when the processing is performed by the computer on the assumption that the controller 7 provided with the acceleration sensor 701 is in a static state (i.e., when the processing is performed while acceleration detected by the acceleration sensor is only the gravitational acceleration), if the controller 7 is actually in a static state, the detected acceleration is used to determine whether or not the controller 7 is inclined relative to the direction of gravity or how many degrees the controller 7 is inclined relative to the direction of gravity. More specifically, when a state where a detection axis of the acceleration sensor 701 extends in a vertically-down direction is set as a standard state, it is possible to determine whether or not the controller 7 is inclined relative to the vertically-down direction, by determining whether or not 1G (the gravitational acceleration) is applied in a direction of he detection axis of the acceleration sensor 701. It is also possible to determine how many degrees the controller 7 is inclined relative Lo the vertically-down direction, by determining a magnitude of acceleration applied in the above detection axis direction. In addition, in the case where the acceleration sensor 701 is capable of detecting acceleration along multiple axes, it is possible to determine in detail how many degrees the controller 7 is inclined relative to the direction of gravity through processing of a signal of acceleration detected for each axis. In this case, a processor may perform processing based on the output from the acceleration sensor 701 for calculating data indicating an inclination angle of the controller 7. Alternatively, processing may be performed so as to infer rough inclination of the controller 7 based on the output from the acceleration sensor 701 without calculating the data indicating the inclination angle. As described above, the acceleration sensor 701 is used in combination with the processor to determine an inclination, orientation or position of the controller 7.

On the other hand, on the assumption that the acceleration sensor 701 is in a dynamic state, the acceleration sensor 701 detects acceleration corresponding to a motion of the acceleration sensor 701 in addition to the gravitational acceleration component. Thus, it is possible to determine, for example, a direction of the motion of the controller 7 by eliminating the gravitational acceleration component through predetermined processing. More specifically, various movements and/or positions of the controller 7 can be calculated through processing of acceleration signals that are generated by the acceleration sensor 701 when the controller 7 provided with the acceleration sensor 701 is subjected to dynamic acceleration by the hand of the player. It is noted that even on the assumption that the acceleration sensor 701 is in a dynamic state, it is possible to determine an inclination of the controller 7 relative to the direction of gravity by eliminating acceleration corresponding to a motion of the acceleration sensor 701 through predetermined processing.

In an alternative embodiment, the acceleration sensor 701 may include an embedded signal processor or other type of dedicated processor for performing any desired processing of the acceleration signal outputted from the accelerometer therein prior to outputting a signal to the microcomputer 751. For example, the embedded or dedicated processor may convert the detected acceleration signal into a corresponding inclination angle (or into other preferred parameter) in the case where the acceleration sensor 701 is intended to detect static acceleration (e.g., the gravitational acceleration). Data indicative of the acceleration detected by the acceleration sensor 701 is outputted to the communication section 75.

The communication section 75 includes the microcomputer 751, a memory 752, the wireless module 753 and the antenna 754. The microcomputer 751 controls the wireless module 753 for wirelessly transmitting transmission data while using the memory 752 as a storage area during processing. The microcomputer 751 also controls operations of the sound IC 707 and the vibrator 704 in accordance with data which the wireless module 753 has received from the game apparatus body 5 via the antenna 754. The sound IC 707 processes sound data or the like transmitted from the game apparatus body 5 via the communication section 75. Further, the microcomputer 751 activates the vibrator 704 in accordance with vibration data or the like (e.g., a signal for causing the vibrator 704 to be ON or OFF) which is transmitted from the game apparatus body 5 via the communication section 75.

Operation signals from the operation sections 72 provided on the controller 7 (key data), acceleration signals from the acceleration sensor 701 with respect to the three axial directions (X-, Y- and Z-axis direction acceleration data), and the process result data from the imaging information calculation section 74, are outputted to the microcomputer 751. The microcomputer 751 temporarily stores inputted data (the key data, the X-, Y- and Z-axis direction acceleration data, and the process result data) in the memory 752 as transmission data to be transmitted to the wireless controller module 19. Here, radio transmission from the communication section 75 to the wireless controller module 19 is performed at predetermined time intervals. Since game processing is generally performed at a cycle of 1/60 sec, the radio transmission needs to be performed at a shorter cycle. Specifically, game processing is performed at a cycle of 16.7 ms (1/60 sec), and a transmission interval of the communication section 75 configured using the Bluetooth (registered trademark) technology is 5 ms. At a timing of performing a transmission to the wireless controller module 19, the microcomputer 751 outputs, to the wireless module 753, the transmission data stored in the memory 752 as a series of pieces of operation information. The wireless module 753 uses, for example, the Bluetooth (registered trademark) technology to radiate, using a carrier wave having a predetermined frequency, a radio signal from the antenna 754, the radio signal indicating the series of pieces of operation information. Thus, the key data from the operation sections 72 provided on the controller 7, the X-, Y- and Z-axis direction acceleration data from the acceleration sensor 701, and the process result data from the imaging information calculation section 74, are transmitted from the controller 7. The wireless controller module 19 of the game apparatus body 5 receives the radio signal, and the game apparatus body 5 demodulates or decodes the radio signal to obtain the series of pieces of operation information (the key data, the X-, Y- and Z-axis direction acceleration data, and the process result data). In accordance with the series of pieces of obtained operation information and the game program, the CPU 10 of the game apparatus body 5 performs game processing. In the case where the communication section 75 is configured using the Bluetooth (registered trademark) technology, the communication section 75 can have a function of receiving transmission data wirelessly transmitted from other devices.

Figure 8:
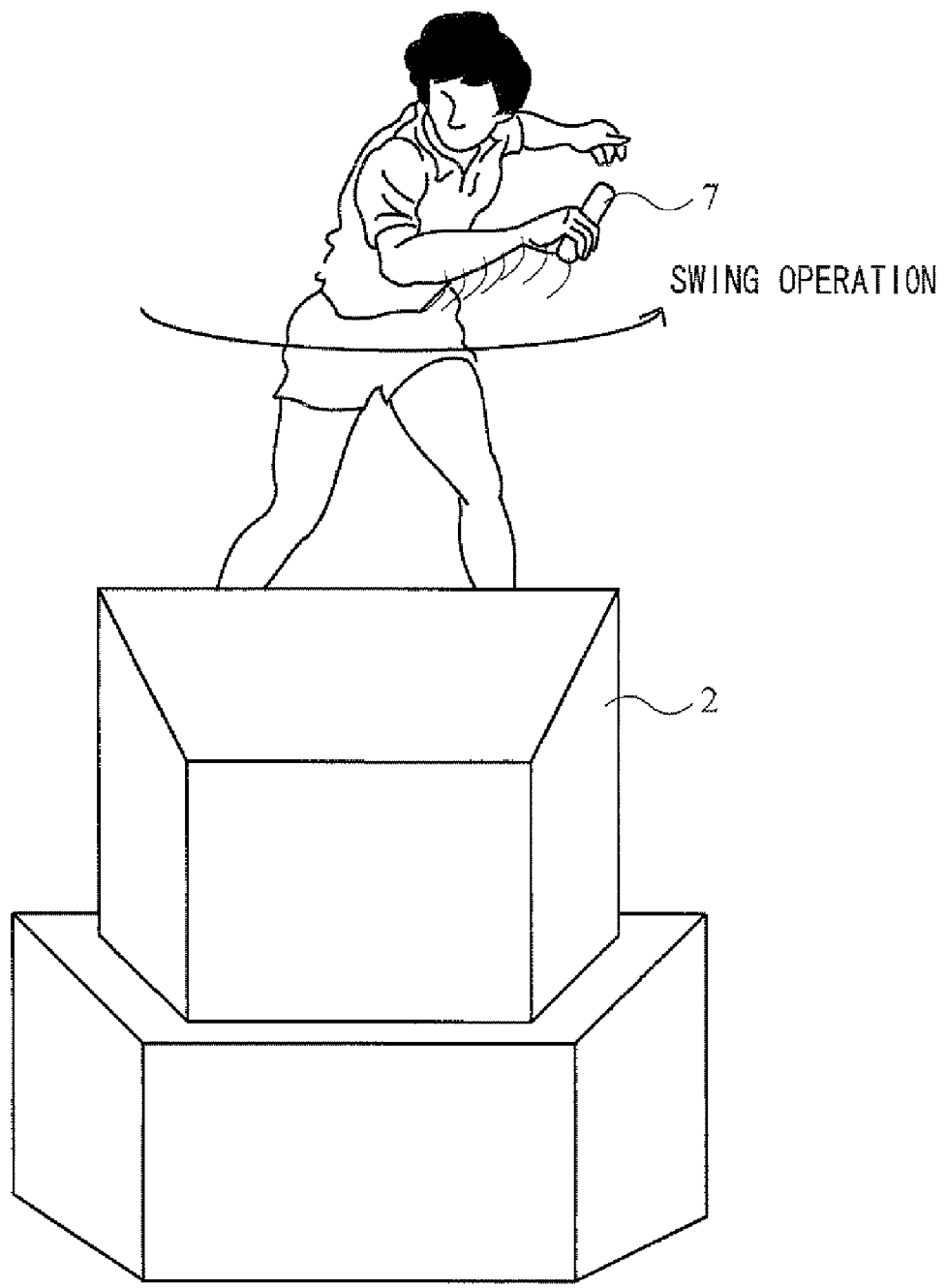
FIG. 8 briefly illustrates an example where a player uses the controller 7 of FIG. 1 to perform game operations.
Figure 9:
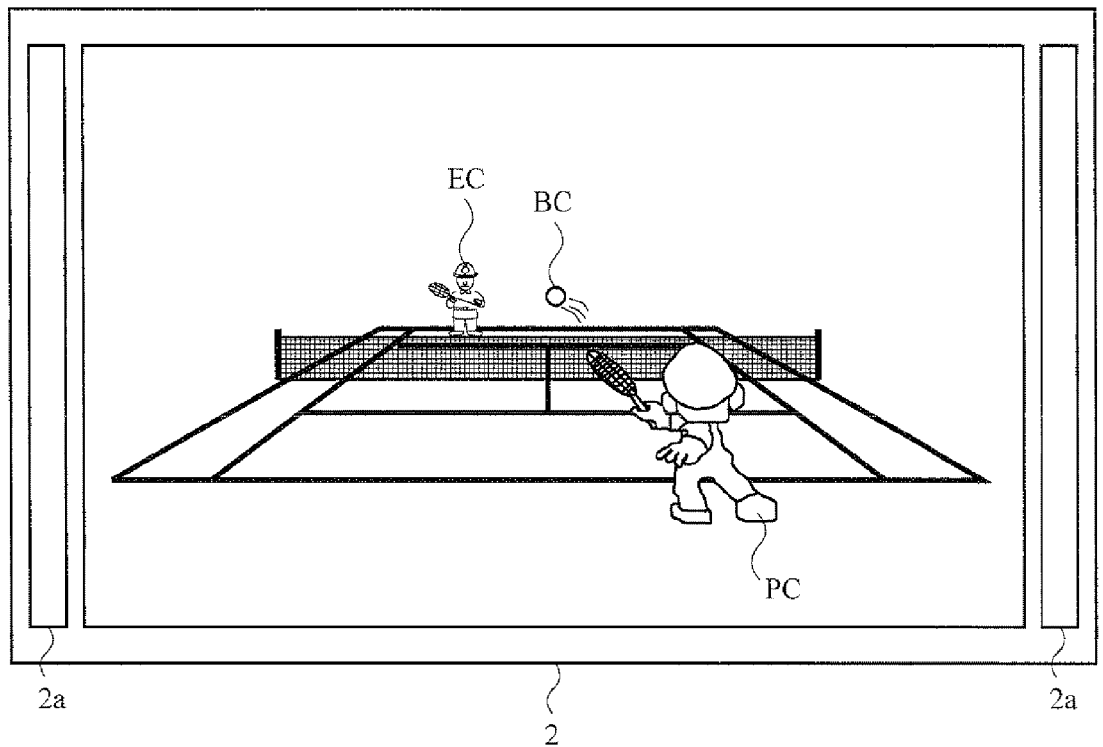
FIG. 9 shows an example of a game image displayed on the monitor 2 shown in FIG. 1.
Figure 11A:
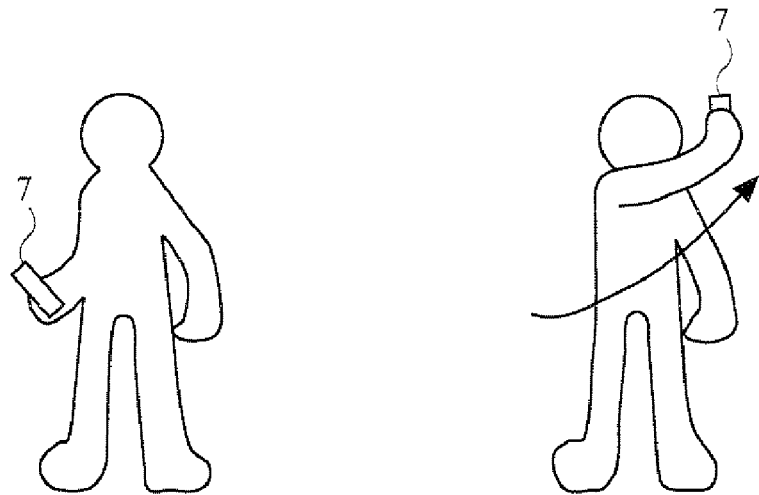
FIG. 11A shows an example of a motion of the player holing the controller 7 and performing a topspin shot in the tennis same.
Figure 11B:
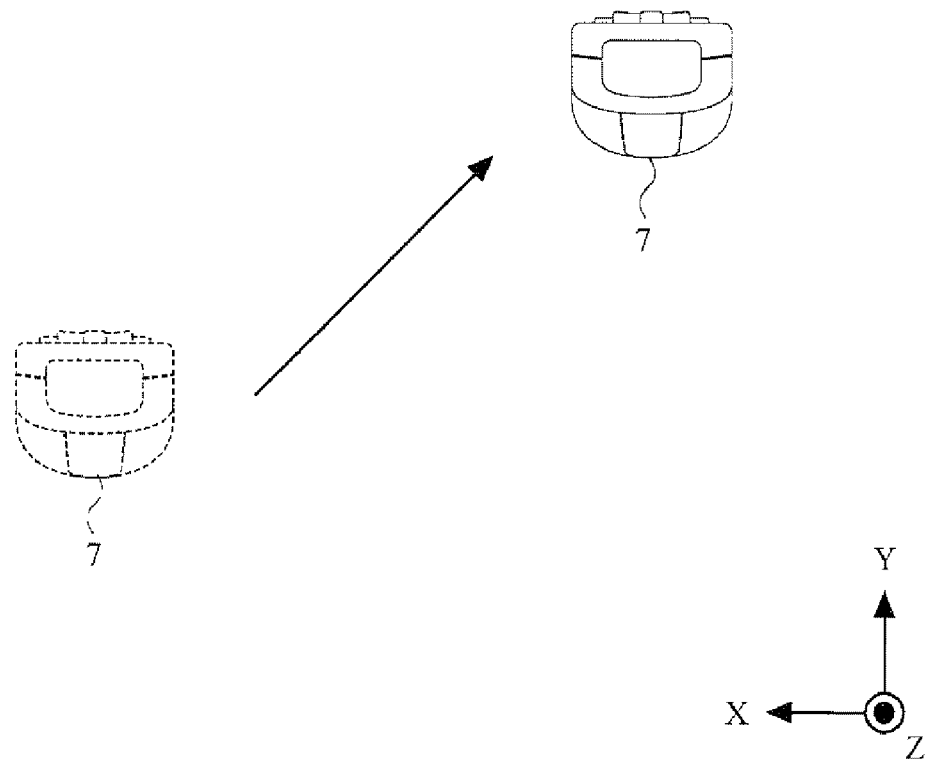
FIG. 11B shows an example of a motion of the controller 7 in the case where the player performs a topspin shot.
Figure 12A:
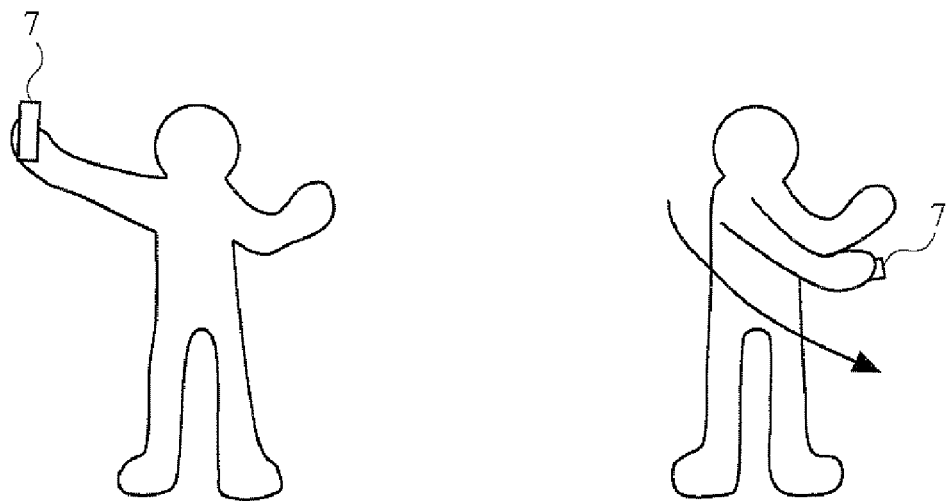
FIG. 12A shows an example of a motion of the player holding the controller 7 and performing a slice spin shot in the tennis game.
Figure 12B:
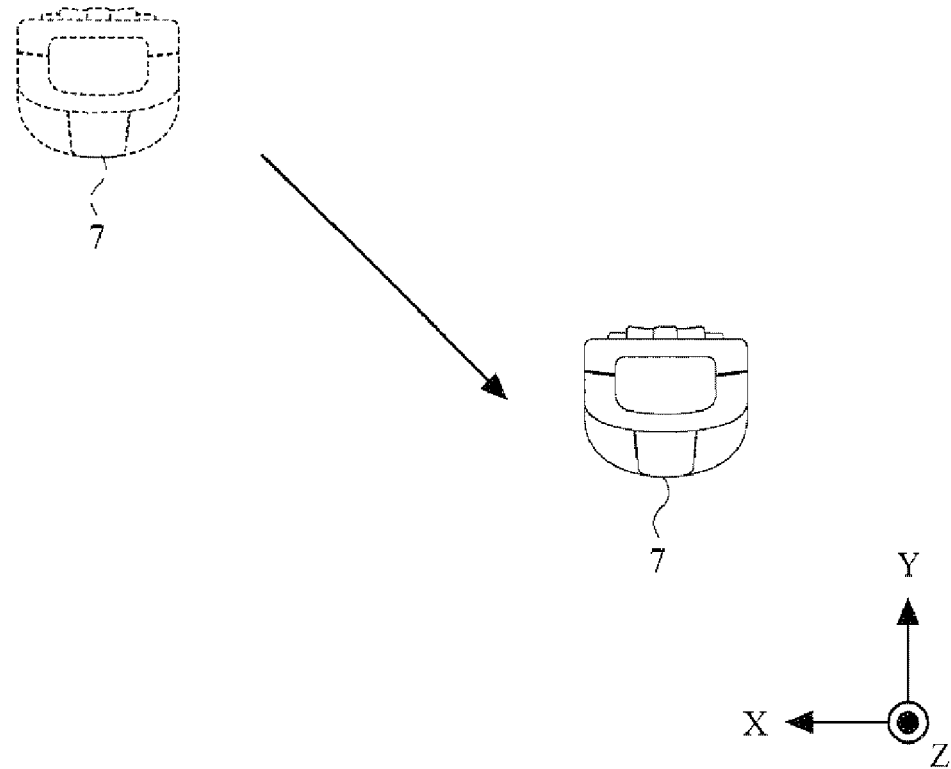
FIG. 12B shows an example of a motion of the controller 7 in the case where the player performs a slice spin shot.

Next, the game played using the game apparatus body 5 will be briefly described with reference to FIGS. 8 to 14, prior to describing specific processing performed by the game apparatus body 5. FIG. 8 briefly illustrates an example where a player uses the controller 7 to perform game operations. FIG. 9 shows an example of a game image displayed on the monitor 2. FIG. 10A shows an example of a motion of the player holding the controller 7 and performing a flat shot in a tennis game. FIG. 10B shows an example of a motion of the controller 7 in the case where the player performs a flat shot. FIG. 11A shows an example of a motion of the player holing the controller 7 and performing a topspin shot in the tennis game. FIG. 11B shows an example of a motion of the controller 7 in the case where the player performs a topspin shot. FIG. 12A shows an example of a motion of the player holding the controller 7 and performing a slice spin shot in the tennis game. FIG. 12B shows an example of a motion of the controller 7 in the case where the player performs a slice spin shot. FIG. 13A shows an example of a motion of the player holding the controller 7 and performing a drop shot or a smash shot in the tennis game. FIG. 13B shows an example of a motion of the controller 7 in the case where the player performs a drop shot or a smash shot. FIG. 14A shows an example of a motion of the player holding the controller 7 and performing a lob shot in the tennis game. FIG. 14B shows an example of a motion of the controller 7 in the case where the player performs a lob shot.

As shown in FIG. 8, the overall size of the controller 7 is small enough to be held by one hand of an adult or even a child. In order to play the game by using the game system 1 with the controller 7, the player holds the controller 7 with one hand (e.g., the right hand), such that the front surface of the controller 7 faces forward from the player. For example, the player holds the controller 7 as if the player held a tennis racket, by placing the thumb on the left-side surface of the controller 7, the palm on the top surface of the controller 7, the index finger, middle finger, ring finger and the little finger on the bottom surface of the controller 7, such that the front surface of the controller 7 is exposed so as to face forward from the player. Note that, in a description of processing provided later, an example is given where the player operates the controller 7 while holding the controller 7 so as to point the top surface thereof upward.

In accordance with a game image displayed on the monitor 2, the player swings his/her arm holding the controller 7 (i.e., performs a swing operations), thereby providing operation information (specifically, X-, Y- and Z-axis direction acceleration data) from the controller 7 to the game apparatus body 5. The player is able to provide various X-, Y- and Z-axis direction acceleration data From the controller 7 to the game apparatus body 5 by swinging the controller 7 in various directions.

As shown in FIG. 9, a tennis game or the like is displayed on the monitor 2 in accordance with the X-, Y- and Z-axis direction acceleration data received from the controller 7. To be specific, a tennis court set in a virtual game space is displayed on the monitor 2 as a three-dimensional game image. Then, a player character PC controlled by the player, an opponent character EC that is an opponent player of the player character PC, a ball character BC shown as a tennis ball moving on the tennis court, and the like are placed in the virtual game space, and displayed on the monitor 2. Hereinafter, in order to give a specific description/described below is a case where a game program for realizing a tennis game is stored in the optical disc 4, and a swing determination process among tennis game processes is performed by the CPU 10 for determining a swing type of the controller 7.

The player character PC holding a tennis racket is placed on the tennis court set in the virtual game space. Animation showing the player character PC swinging the tennis racket is displayed in response to an action of the player swinging the controller 7. When the player character PC returns the arriving ball character BC with the tennis racket, the ball character BC hit by the tennis racket flies toward the opponent character EC side of the court. In other words, when the player holding the controller 7 performs an action of swinging the controller 7, the player character PC shows an action of swinging the tennis racket in a similar manner. This allows the player to experience a virtual sports game that allows the player to feel as if to be swinging a tennis racket to play tennis.

For example, in the case where the player character PC is shown as a right-handed tennis player, when the player holds and swings the controller 7 from right to left, the player character PC swings the tennis racket on forehand. Whereas, when the player holds and swings the controller 7 from left to right, the player character PC swings the tennis racket on backhand. In other words, in accordance with a direction in which the player swings the controller 7, the player character PC performs an action of swinging the tennis racket in the same direction.

Further, a direction or a speed, by which the ball character BC hit by the tennis racket swung by the player character PC flies, varies in accordance with a timing or a speed at which the player swings the controller 7. Moreover, a shot type with which to hit the ball character BC varies in accordance with a direction in which the player swings the controller 7. As will hereinafter be described in detail, motions of the controller 7 can be distinguished from each other based on the X-, Y- and Z-axis direction acceleration data outputted from the controller 7, whereby the tennis game, in which various motions of the controller 7 caused by the player are reflected, can be expressed. Described below is an example of swing types to be determined in the case where the player holds and swings the controller 7 with the right hand.

For example, when the player horizontally swings the controller 7 from right to left as shown in FIG. 10A, a flat shot is selected in the tennis game, and in the virtual game space, the player character PC performs an action of swinging the tennis racket to hit a flat shot. Then, in the virtual game space, the ball character BC hit by the player character PC with the flat shot is returned to fly in a straight trajectory. Here, when the player horizontally swings the controller 7 from right to left, the swing by the player causes the controller 7 to move in the X-axis negative direction (see FIG. 10B). In this case, when the controller 7 accelerates during the swing/centrifugal force in the Z-axis positive direction and acceleration in the X-axis negative direction are applied to the controller 7. Accordingly, when X- and Y-axis components of the acceleration, which are indicated by the X-, Y- and Z-axis direction acceleration data outputted from the controller 7, indicate that the acceleration in the X-axis negative direction has occurred, it is determined that the player has horizontally swung the controller 7 from right to left. Accordingly, it is determined that a flat shot has been selected.

Further, when the player swings the controller 7 from bottom right to top left as shown in FIG. 11A, a topspin shot is selected in the tennis game, and in the virtual game space, the player character PC performs an action of swinging the tennis racket to hit a topspin shot. Then, in the virtual game space, the ball character BC hit by the player character PC with the topspin shot is returned in a high trajectory with topspin. Here, when the player swings the controller 7 from bottom right to top left, the swing by the player causes the controller 7 to move in an intermediate direction between the X-axis negative direction and the Y-axis positive direction (see FIG. 11B). In this case, when the controller 7 accelerates during the swing, centrifugal force in the Z-axis positive direction and acceleration in the intermediate direction between the X-axis negative direction and the Y-axis positive direction are applied to the controller 7. Accordingly, when X- and Y-axis components of the acceleration, which are indicated by the X-, Y- and Z-axis direction acceleration data outputted from the controller 7, indicate that the acceleration in the intermediate direction between the X-axis negative direction and the Y-axis positive direction has occurred, it is determined that the player has swung the controller 7 from bottom right to top left. Accordingly, it is determined that a topspin shot has been selected.

Still further, when the player swings the controller 7 from top right to bottom left as shown in FIG. 12A, a slice spin shot is selected in the tennis game, and in the virtual game space, the player character PC performs an action of swinging the tennis racket to hit a slice spin shot. Then, in the virtual game space, the ball character BC hit by the player character PC with the slice spin shot is returned in a low trajectory with slice spin Here, when the player swings the controller 7 from top right to bottom left, the swing by the player causes the controller 7 to move in an intermediate direction between the X-axis negative direction and the Y-axis negative direction (see FIG. 12B). In this case, when the controller 7 accelerates during the swing, centrifugal force in the Z-axis positive direction and acceleration in the intermediate direction between the X-axis negative direction and the Y-axis negative direction are applied to the controller 7. Accordingly, when X- and Y-axis components of the acceleration, which are indicated by the X-, Y- and Z-axis direction acceleration data outputted from the controller 7, indicate that the acceleration in the intermediate direction between the X-axis negative direction and the Y-axis negative direction has occurred, it is determined that the player has swung the controller 7 from top right to bottom left. Accordingly, it is determined that a slice spin shot has been selected.

Still further, when the player swings the controller 7 downward from top to bottom as shown in FIG. 13A, a drop shot or a smash shot is selected in the tennis game, and in the virtual game space, the player character PC performs an action of swinging the tennis racket to hit a drop shot or a smash shot. Note that, whether a drop shot or a smash shot is selected is determined based on a game situation at the time of the swing. Then, in the virtual game space, the ball character BC hit by the player character PC with the drop shot is returned so as to drop near the net on the tennis court. Also, in the virtual game space, the ball character BC hit by the player character PC with a smash shot is returned in a top-to-bottom trajectory as a smash shot. Here, when the player swings the controller 7 downward from top to bottom, the swing by the player causes the controller 7 to move in the Y-axis negative direction (see FIG. 13B). In this case, when the controller 7 accelerates during the swing, centrifugal force in the Z-axis positive direction and acceleration in the Y-axis negative direction are applied to the controller 7. Accordingly, when X- and Y-axis components of the acceleration, which are indicated by the X-, Y- and Z-axis direction acceleration data outputted from the controller 7, indicate that the acceleration in the Y-axis negative direction has occurred, it is determined that the player has swung the controller 7 downward from top to bottom. Accordingly, it is determined that a drop shot or a smash shot has been selected.

Still further, when the player swings the controller 7 upward from bottom to top as shown in FIG. 14R, a lob shot is selected in the tennis game, and in the virtual game space, the player character PC performs an action of swinging the tennis racket to hit a lob shot. Then, in the virtual game space, the ball character BC hit by the player character PC with the lob shot is returned in a very high trajectory so as to drop deep in the opponent's side of the court as a lob shot. Here, when the player swings the controller 7 upward from bottom to top, the swing by the player causes the controller 7 to move in the Y-axis positive direction (see FIG. 14B). In this case, when the controller 7 accelerates during the swing, centrifugal force in the Z-axis positive direction and acceleration in the Y-axis positive direction are applied to the controller 7.

Accordingly, when X and Y-axis components of the acceleration, which are indicated by the X-, Y- and Z-axis direction acceleration data outputted from the controller 7, indicate that the acceleration in the Y-axis positive direction has occurred, it is determined that the player has swung the controller 7 upward from bottom to top. Accordingly, it is determined that a lob shot has been selected.

Here, in both the case of swinging the controller 7 for the topspin shot (see FIG. 11A) and the case of swinging the controller 7 for the lob shot (see FIG. 14A), the player swings the controller 7 upward. In an actual tennis game, however, a strength and a manner of swinging the racket are often different between the case where the player swings the racket upward to hit a topspin shot and the case where the player swings the racket upward to hit a lob shot. As will hereinafter be described in detail, in the present embodiment, a criterion, for distinguishing a topspin shot and a lob shot, is changed in accordance with the strength and the manner of swinging the controller 7 upward by the player. This realizes the swing type to be determined more accurately.

Figure 15:
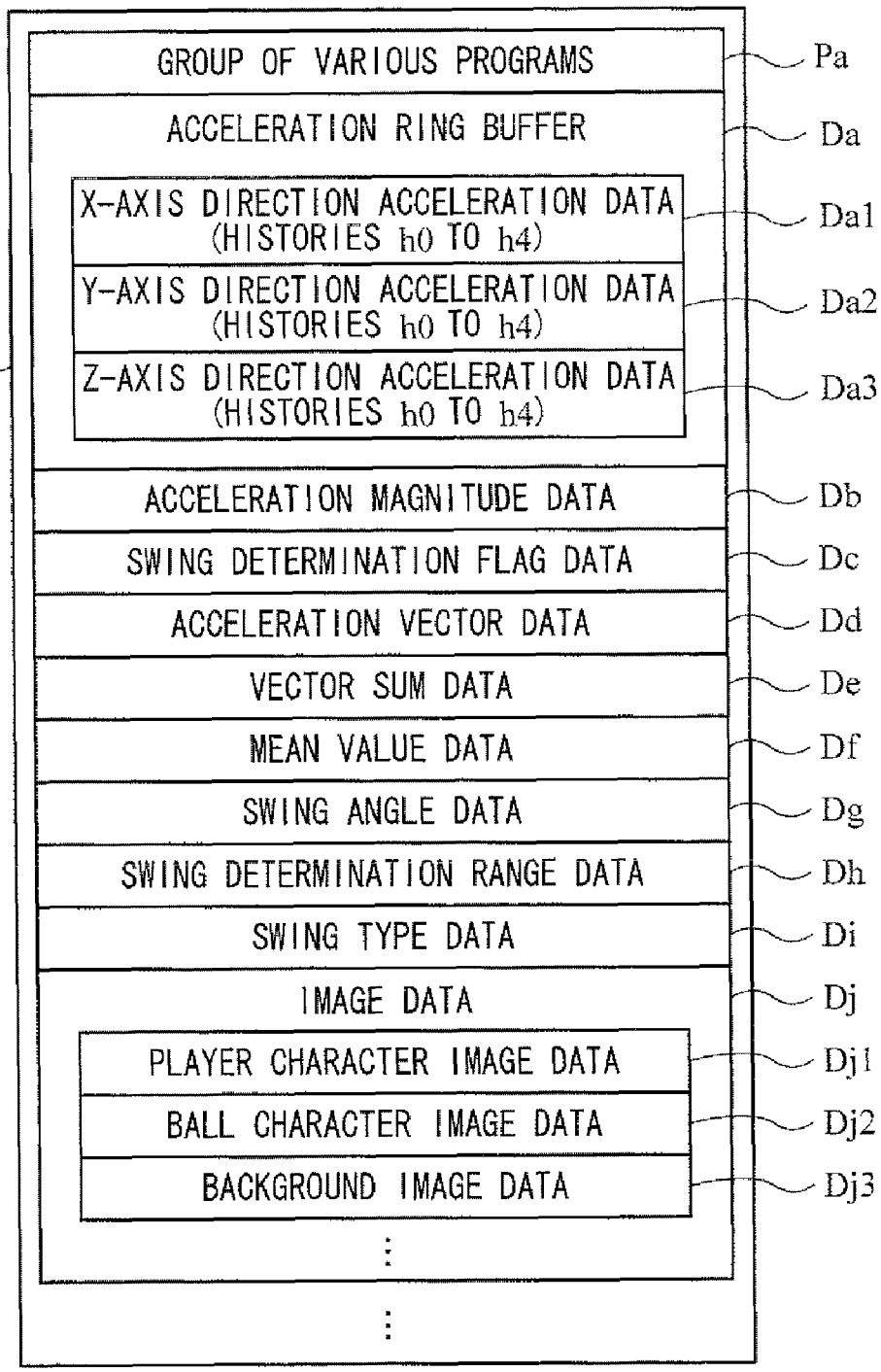
FIG. 15 shows main data and programs stored in a main memory of the game apparatus body 5.

Next, the game processing performed by the game system 1 will be described in detail. First, main data to be used in the game processing will be described with reference to FIG. 15. FIG. 15 shows main data and programs stored in the external main memory 12 and/or the internal main memory 35 of the game apparatus body 5 (hereinafter, these two main memories are collectively referred to as a main memory).

As shown in FIG. 15, a data storage area of the main memory stores acceleration ring buffer Da, acceleration magnitude data Db, swing determination flag data Dc, acceleration vector data Dd, vector sum data De, mean value data Df, swing angle data Dg, swing determination range data Dh, swing type data Di, image data Dj, and the like. Note that, in addition to the data contained in the information shown in FIG. 15, the main memory stores data necessary for the game processing, or example, data (e.g., position data) relating to characters appearing in the game which are different from the player character PC (e.g., the opponent character EC). Further, a program storage area of the main memory stores a group of various programs Pa constituting the game program.

The acceleration ring buffer Da stores data which indicates acceleration having been applied to the controller 7 and which is a history of acceleration data contained in a series of pieces of operation information that are transmitted from the controller 7 as transmission data. The acceleration ring buffer Da stores: X-axis direction acceleration data Da1 indicating a history of accelerations h0 to h4 that have been detected by the acceleration sensor 701 with respect to the X-axis component (i.e., a history of accelerations having occurred five times with respect to the X-axis direction); Y-axis direction acceleration data Da2 indicating a history of accelerations h0 to h4 that have been detected with respect to the Y-axis component (i.e., a history of accelerations having occurred five times with respect to the Y-axis direction); and Z-axis direction acceleration data Da3 indicating a history of accelerations h0 to h4 that have been detected with respect to the Z-axis component (i.e., a history of accelerations having occurred five times with respect to the Z-axis direction). Note that, the wireless controller module 19 included in the game apparatus body 5 receives the acceleration data contained in the operation information that is transmitted from the controller 7 at predetermined intervals (e.g., every 1/200 sec), and stores the acceleration data in a buffer (not shown) of the wireless controller module 19. Thereafter, the acceleration data stored in the buffer is read every frame (e.g., every 1/60 sec) that is a game processing cycle, and the acceleration ring buffer Da of the main memory is updated accordingly.

Here, since the cycle for receiving the operation information is different from the game processing cycle, pieces of operation information received at multiple timings are written in the buffer. In later-described processing, at each step, the processing is performed by always using only the most recent piece of operation information from among the pieces of operation information received at the multiple timings, and then the processing proceeds to the next step.

A flow of the processing will be described later by using an example where the acceleration data Da is updated every frame that is a game processing cycle. However, the acceleration data Da may be updated at a different processing cycle. For example, the acceleration ring buffer Da may be updated at a transmission cycle of the controller 7, and the updated acceleration ring buffer Da may be used in each game processing cycle. In this case, the cycle for updating the acceleration data Da1 to Da3 stored in the acceleration ring buffer Da is different from the game processing cycle.

The acceleration magnitude data Db contains data that indicates a magnitude accv of acceleration exerted on the controller 7. The swing determination flag data Dc contains data indicating a swing determination flag SWfrg that is set to ON when it is determined that the player has swung the controller 7.

The acceleration vector data Dd indicates a history of acceleration vectors that are calculated, for the respective histories h0 to h4, using the acceleration indicated by the X-axis direction acceleration data Da1, the Y-axis direction acceleration data Da2 and the Z-axis direction acceleration data Da3. Data contained in the acceleration vector data Dd indicates a direction and a magnitude of acceleration exerted on the controller 7. The vector sum data De contains data indicating a vector sum that results from: eliminating a gravity component from each acceleration vector indicated by the acceleration vector data Dd, and adjusting a code of each acceleration vector; and adding (summing) up each acceleration vector. The mean value data Df contains data that indicates a mean value of magnitudes of the acceleration vectors indicated by the acceleration vector data Dd.

The swing angle data Dg indicates an angle at which the controller 7 has been swung. The swing angle data Dg contains data that indicates a swing angle that has been determined with respect to the X-axis positive direction on an X-Y axis plane set for the controller 7. The swing determination range data Dh is for determining a swing type by using the swing angle. The swing determination range data Dh contains data that sets swing angle determination ranges for respective swing types. Note that, an example of setting swing angle determination ranges, which are set for respective swing types and contained in the swing determination range data Dh, will be described later. The swing type data Di contains data indicating a swing type that has been determined using the swing angle.

Image data Dj contains player character image data Dj1, ball character image data Dj2, background image data Dj3 and the like. The player character image data Dj1 is for placing the player character PC in the virtual game space and generating a game image thereof. The ball character image data Dj2 is for placing the ball character BC in the virtual game space and generating a game image thereof. The background image data Dj3 is for providing a background of the virtual game space and generating a game image thereof.

Figure 16:
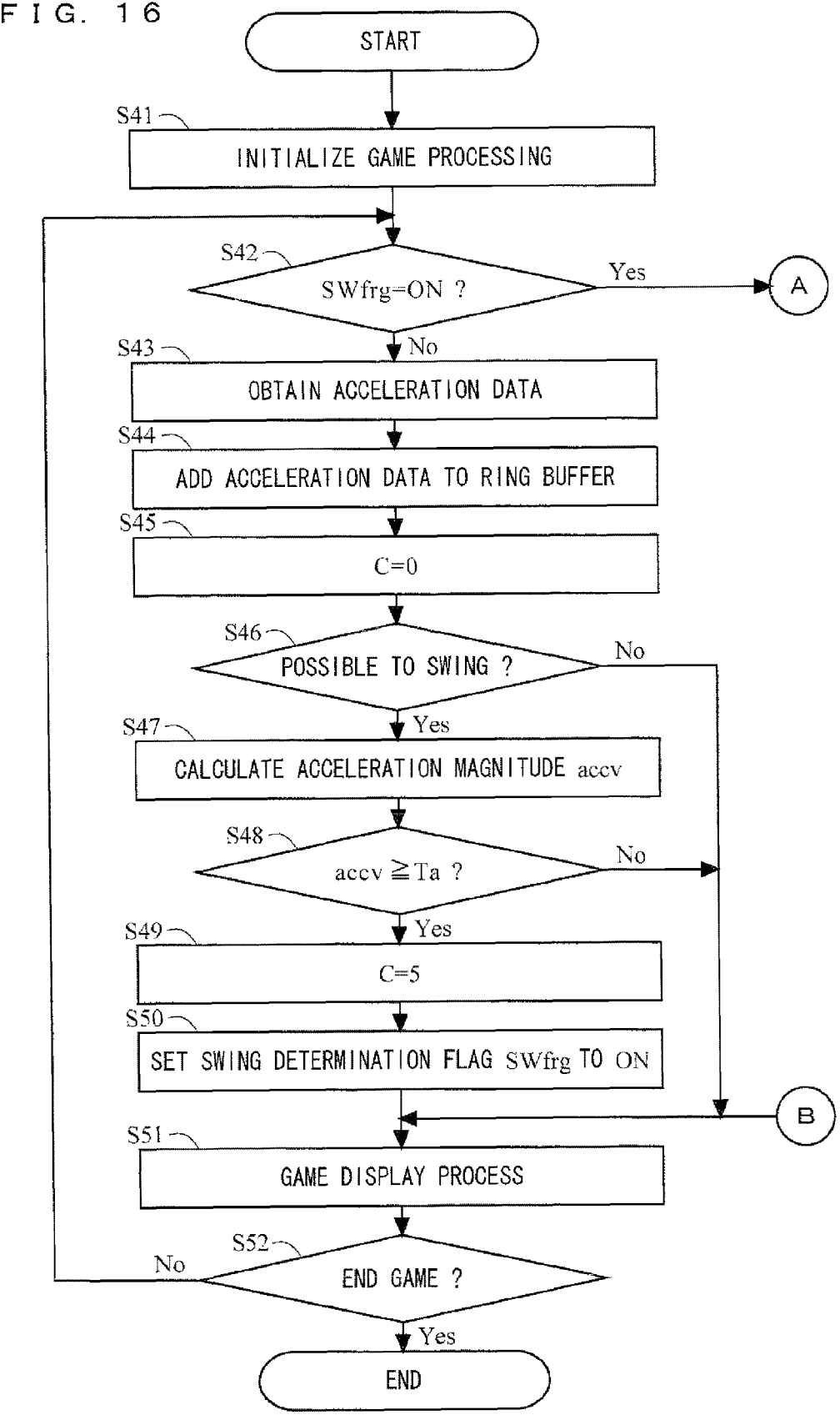
FIG. 16 shows a flowchart showing an example of game processing performed by the game apparatus body 5.
Figure 17:
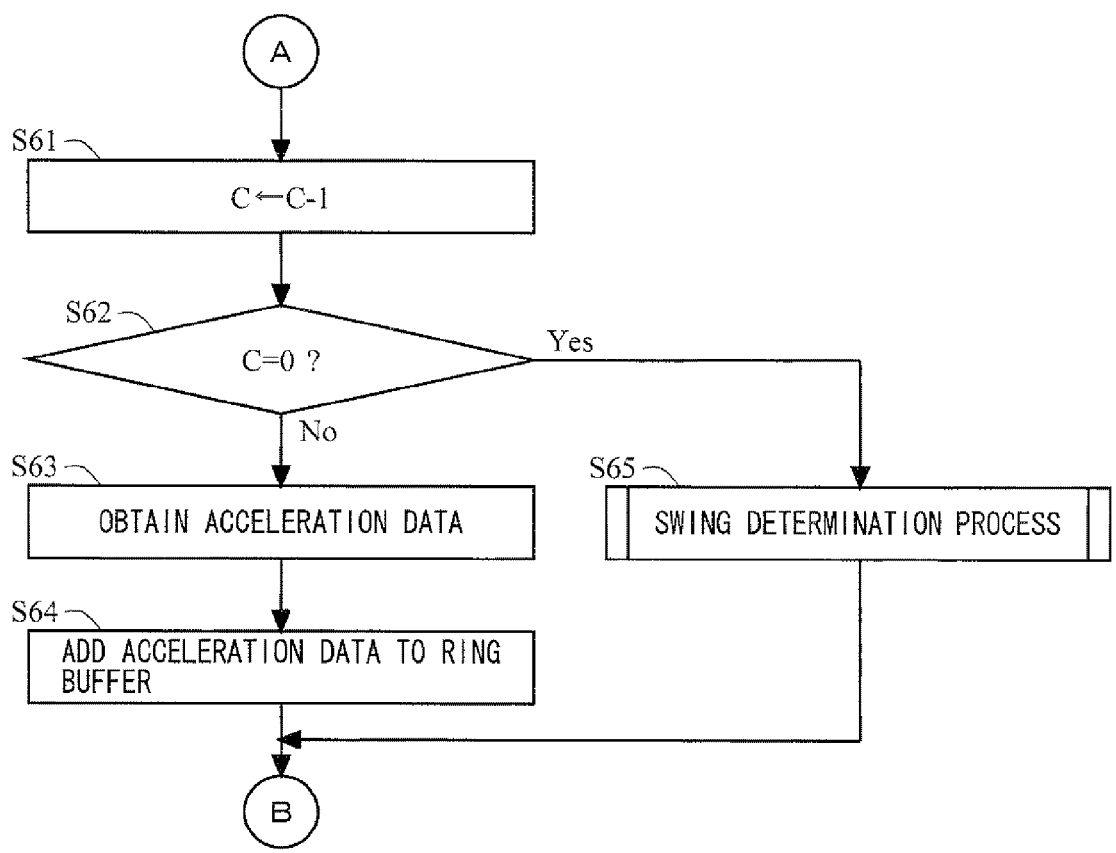
FIG. 17 shows a flowchart showing an example of game processing performed by the game apparatus body 5.
Figure 18:
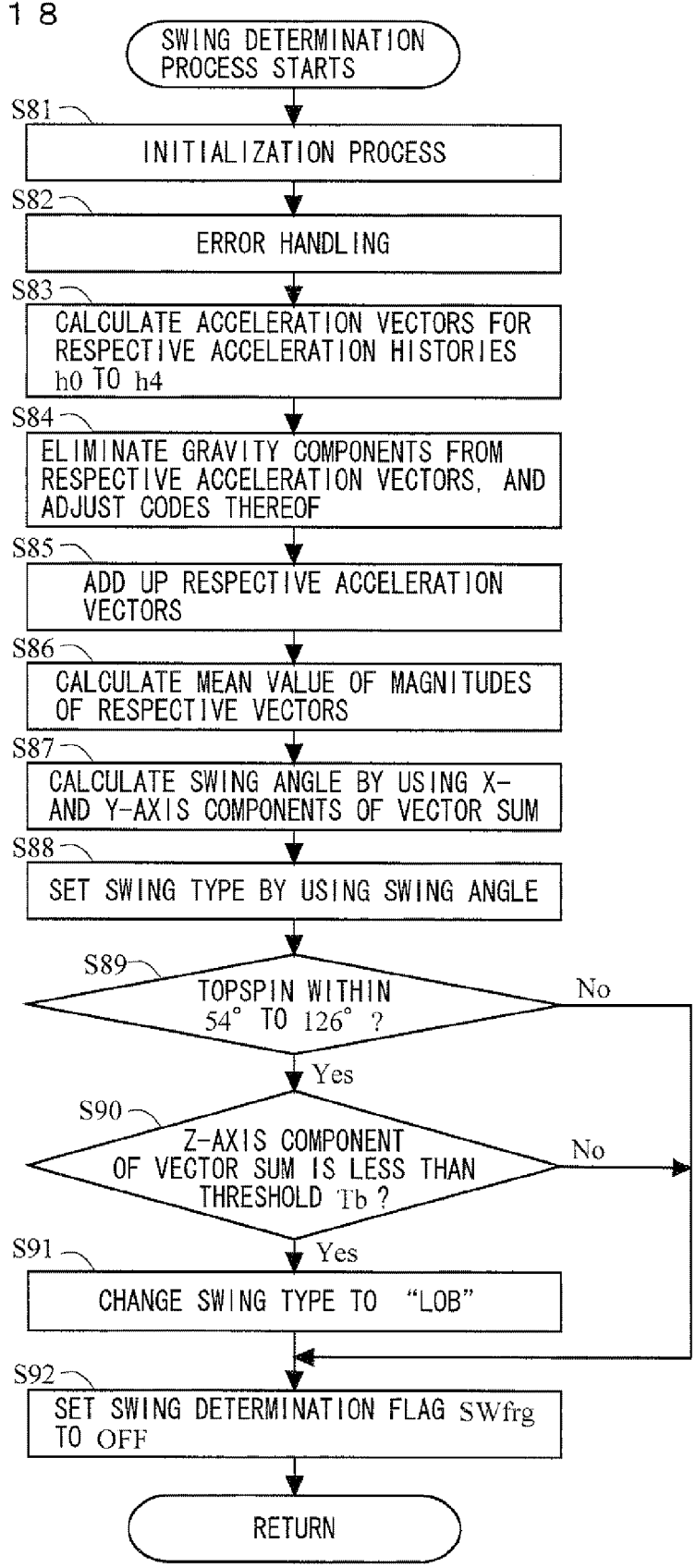
FIG. 18 shows a subroutine showing an example of a swing determination process at step 65 in FIG. 17.

Described next with reference to FIGS. 16 to 18 are details of the game processing performed by the game apparatus body 5. FIGS. 16 and 17 show a flowchart that shows an example of the game processing performed by the game apparatus body 5. FIG. 18 shows a subroutine that shows an example of the swing determination process at step 65 in FIG. 17. Here, the flowchart shown in FIGS. 16 to 18 describes, as an example of the game processing, operations performed in a tennis game. Moreover, the flowchart shown in FIGS. 16 to 18 mainly describes, from among processes performed in the game processing, a process of causing the player character PC to hit the ball character BC in response to the player swinging the controller 7, and detailed descriptions of other processes in the game processing, which are not directly relevant to the present invention, will be omitted. In FIGS. 16 to 18, each step performed by the CPU 10 will be abbreviated as "S".

When the game apparatus body 5 is turned on, the CPU 10 of the game apparatus body 5 executes a boot program stored in the ROM/RTC 13, whereby each unit such as the main memory is Initialized. Then, a game program stored in the optical disc 4 is loaded to the main memory, whereby an execution of the game program by the CPU 10 starts. The flowchart in FIGS. 16 to 18 shows the game processing that is performed after the above process is completed.

In FIG. 16, the CPU 10 initializes the game processing (step 41), and then proceeds to a process at the next step. Performed as the game processing initialization at the above step 41 are, for example, setting of the virtual game space and initial setting of the player character PC, the opponent character EC and the like. Also, in the game processing initialization at the above step 41, parameters used in the game processing thereafter are initialized. For example, the CPU 10 sets parameters, which are indicated by the data Da to Di stored in the above-described main memory, to initial values. Further, in the game processing initialization at the above step 41, the player's dominant hand to hold the controller 7 for the game play is set, that is, whether to use the right hand or the left hand to hold the controller 7 is set. Note that, either hand may be selected in advance by the player, and the selected hand may be set as the dominant hand.

Next, the CPU 10 determines whether or not the swing determination flag SWfrg contained in the swing determination flag data Dc is ON (step 42). Then, the CPU 10 proceeds to a process at the next step 43 when the swing determination flag SWfrg is set to OFF. On the other hand, when the swing determination flag SWfrg is set to ON, the CPU 10 proceeds to a process at the next step 61 (see FIG. 17).

At step 43, the CPU 10 obtains, from the controller 7, data indicating acceleration. Then, the CPU 10 uses the data indicating the acceleration, which is obtained at the above step 43, to update the acceleration ring buffer Da (step 44). Then, the processing proceeds to the next step. For example, the CPU 10 obtains operation information received from the controller 7, and stores, in the acceleration ring buffer Da, acceleration indicated by most recent acceleration data contained in the operation information. To be specific, the CPU 10 updates the acceleration histories h0 to h4 stored in the acceleration ring buffer Da, such that the acceleration histories are shifted forward in chronological order. To be more specific, the acceleration history h4 is deleted, and the histories h3, h2, h1 and h0 are shifted Forward in chronological order such that: the history h3 is updated to be the history h4; the history h2 is updated to be the history h3; the history h1 is updated to be the history h2; and the history h0 is updated to be the history h1. Then, the CPU 10 updates the history h0 of the X-axis direction acceleration data Da1, by using acceleration indicated by X-axis direction acceleration data contained in most recent operation information received from the controller 7. Also, the CPU 10 updates the history h0 of the Y-axis direction acceleration data Da2, by using acceleration indicated by Y-axis direction acceleration data contained in the most recent operation information. Then, the CPU 10 updates the history h0 of the Z-axis direction acceleration data Da3, by using acceleration indicated by Z-axis direction acceleration data contained in the most recent operation information.

Next, the CPU 10 sets a count value C, which is a linear variable used in the flowchart, to 0 (step 45), and then the processing proceeds to the next step.

Subsequently, the CPU 10 determines whether or not the player character PC is in a state of being able to perform a swing (step 46). For example, the CPU 10 determines that the player character PC is unable to start a new swing if, for example, the player character PC is unable to perform a swing for the reason that the player character PC is already in the middle of a swing in the virtual game space, or in the middle of performing other action, or the CPU is in the middle of other processing. When the player character PC is able to perform a swing, the CPU 10 proceeds to a process at the next step 47. On the other hand, when the player character PC is unable to perform a swing, the CPU 10 proceeds to a process at step 51.

At step 47, the CPU 10 calculates a magnitude accv of the acceleration obtained at the above step 43, and proceeds to a process at the next step. For example, the CPU 10 uses the X-axis direction acceleration contained in the history h0 of the X-axis direction acceleration data Da1, the Y-axis direction acceleration contained in the history h0 of the Y-axis direction acceleration data Da2 and the Z-axis direction acceleration contained in the history h0 of the Z-axis direction acceleration data Da3, to calculate an acceleration vector that has acceleration components of the respective directions and to calculate a magnitude of the acceleration vector as the acceleration magnitude accv. Then, the CPU 10 updates the acceleration magnitude data Db by using the calculated acceleration magnitude accv.

Next, the CPU 10 determines whether or not the acceleration magnitude accv calculated at the above step 47 is equal to or greater than a threshold Ta (step 48). Here, the threshold Ta is a predetermined value that is used to determine whether or not the player has swung the controller 7. For example, the threshold Ta is set such that Ta=3.5G (1G≈9.8 m/s$^2$). Note that, the value of the threshold Ta may be set as appropriately in accordance with characteristics of the acceleration sensor 701, game settings and the like. When the acceleration magnitude accv is equal to or greater than the threshold Ta, the CPU 10 determines that the player has swung the controller 7, and then proceeds to a process at the next step 49. On the other hand, when the acceleration magnitude accv is less than the threshold Ta, the CPU 10 proceeds to a process at the next step 51.

When it is determined at step 49 that the player has swung the controller 7, the CPU 10 sets the count value C to 5. Then, the CPU 10 sets the swing determination flag SWfrg contained in the swing determination flag data Dc to ON (step 50), and proceeds to a process at the next step 51.

At step 51, the CPU 10 performs a game display process, and then proceeds to a process at the next step. For example, at step 51, the CPU 10 performs a process of causing the player character PC to swing to hit the ball character BC with a swing strength that has been set in accordance with: a swing type indicated by the swing type data Di; a mean value indicated by the mean value data Df; and the like. Then, the CPU 10 performs a process of causing the ball character BC to move after the shot, e.g., causing the ball character BC to fly to the opponent's court after being hit by the player character PC. In addition, the CPU 10 performs other game processes, for example, a process of causing the player character PC to move within the virtual game space. Then, the CPU 10 performs a display process of displaying a game image on the monitor 2 in accordance with these game processes, and proceeds to a process at the next step.

Next, the CPU 10 determines whether or not to end the game (step 52). The game is to be ended, for example, when conditions for game over are satisfied, or when the player has performed an operation to end the game. When the game is not to be ended, the CPU 10 returns to the above step 42 and repeats the processing, whereas when the game is to be ended, the CPU 10 ends the processing of the flowchart.

As shown in FIG. 17, when the swing determination flag SWfrg is set to ON at the above step 42, the CPU 10 sets a new count value C by subtracting 1 from the currently set count value C (step 61), and then determines whether or not the count value C has become 0 (step 62). When the count value C has become 0, the CPU 10 proceeds to a process at the next step 65. On the other hand, the CPU 10 proceeds to a process at the next step 63 when the count value C has not become 0 yet, i.e., when the count value C=1 to 4.

At step 63, the CPU 10 obtains, from the controller 7, data indicating acceleration. Then, the CPU 10 updates the acceleration ring buffer Da by using the data indicating the acceleration, which is obtained at the above step 63 (step 64), and proceeds to a process at the next step 51 (see FIG. 16). Since the processes performed at steps 63 and 64 are the same as those performed at the above-described steps 43 and 44, detailed descriptions thereof will be omitted. Note that, after it is determined at the above-described step 48 that the controller 7 has been swung, the processes at the above steps 63 and 64 are repeated until the count value C becomes 0, and then the processing proceeds to the swing determination process (step 65). In other words, the processes at the above steps 63 and 64 are repeated 4 times after it is determined that the controller 7 has been swung. Accordingly, acceleration data that is obtained when it is determined that the controller 7 has been swung, and acceleration data obtained 4 times thereafter, are contained in the acceleration histories h0 to h4 stored in the acceleration ring buffer Da. Then, the processing proceeds to the swing determination process.

At step 65, the CPU 10 performs the swing determination process, and then procees to a process at the next step 51 (see FIG. 16). Hereinafter, operations in the swing determination process at step 65 will be described in detail with reference to FIG. 18.

The CPU 10 performs an initialization process as shown in FIG. 18 (step 81), and then proceeds to a process at the next step. For example, in the initialization process at the above step 81, each parameter to be used in the subsequent swing determination process is initialized. For example, the CPU 10 sets parameters, which are indicated by the data Dd to Di stored in the above-described main memory, to initial values.

Next, the CPU 10 refers to the acceleration histories h0 to h4 stored in the acceleration ring buffer Da, and performs error handling (step 82). Then, the processing proceeds to the next step. For example, the CPU 10 refers to the acceleration histories h0 to h4, and searches the histories h0 to h4 for erroneous data. To be specific, in the case where any of the histories h0 to h4 contains data that indicates acceleration whose direction (positive or negative) is opposite to that of the other histories, the CPU 10 determines the data to be erroneous data. Then, the CPU 10 corrects the erroneous data to acceleration data indicating a stationary state of the controller 7 (e.g., acceleration indicating that the X-axis direction acceleration and the Z-axis direction acceleration are both 0, and the Y-axis direction acceleration is −1G).

Next, the CPU 10 calculates acceleration vectors for the respective acceleration histories h0 to h4 stored in the acceleration ring buffer Da (step 83), and proceeds to a process at the next step. For example, the CPU 10 uses the X-axis direction accelerations respectively contained in the histories h0 to h4 of the X-axis direction acceleration data Da1, Y-axis direction accelerations respectively contained in the histories h0 to h4 of the Y-axis direction acceleration data Da2, and Z-axis direction accelerations respectively contained in the histories h0 to h4 of the Z-axis direction acceleration data Da3, to calculate acceleration vectors for the histories h0 to h4, respectively, the acceleration vectors each containing acceleration components of the respective directions (i.e., calculate acceleration vectors for the past 5 frames, respectively). Then, the CPU 10 updates the acceleration vector data Dd by using the calculated acceleration vector histories.

Next, the CPU 10 eliminates gravity components from the respective acceleration vectors calculated at the above step 83, and adjusts codes of the respective acceleration vectors (step 84). Then, the processing proceeds to the next step. Here, it is assumed that the acceleration sensor 701 has a feature that data outputted from the acceleration sensor 701 indicates a directly opposite direction to that of acceleration applied to the acceleration sensor 701 (i.e., a directly opposite direction Lo an actual direction of the acceleration). That is, data, which corresponds to the force of inertia caused by the acceleration of the acceleration sensor 701, is outputted from the acceleration sensor 701 as acceleration data. It is noted here that the gravitational acceleration, which is applied to the acceleration sensor 701 when the controller 7 is stationary, is outputted as acceleration data indicating the same direction as the gravity direction. When it is assumed that the player holds and operates the controller 7 while maintaining a state where the upper surface of the controller 7 faces upward, the gravitational acceleration (1G) in the Y-axis negative direction is applied to the controller 7. In this case, the CPU 10 is able to eliminate a gravity component from each acceleration vector calculated at the above step 83, by adding 1G to the Y-axis component of each acceleration vector calculated at step 83. Then, the CPU 10 adjusts codes of the respective acceleration vectors such that directions of the respective acceleration vectors calculated at the above step 83 are in a direction in which the controller 7 is moving (i.e., in an actual acceleration direction) As described above, when the data outputted from the acceleration sensor 701 indicates a directly opposite direction to that of the acceleration applied to the acceleration sensor 701, the CPU 10 performs code adjustment such that a direction of each acceleration vector becomes directly opposite thereto. In this manner, the actual acceleration direction is used as the direction of each acceleration vector. Then, the CPU 10 updates the acceleration vector data Ed by using each acceleration vector from which the gravity component has been eliminated and on which the code adjustment has been performed.

Next, the CPU 10 adds up (sums up) all the acceleration vectors, from which the gravity components have been eliminated and on which the code adjustment has been performed at the above step 84, to calculate a vector sum, and updates the vector sum data De by using the calculated vector sum (step 85). Further, the CPU 10 calculates a mean value of magnitudes of the acceleration vectors from which the gravity components have been eliminated and on which the code adjustment has been performed at the above step 84. The CPU 10 updates the mean value data Df (step 86) by using the calculated mean value, and then proceeds to a process at the next step.

Subsequently, the CPU 10 calculates a swing angle θ by using X- and Y-axis components of the vector sum calculated at the above step 85 (step 87), and then proceeds to a process at the next step. For example, the CPU 10 calculates a swing angle θ indicated by a direction defined by the X- and Y-axis components of the vector sum, by setting the X-axis positive direction as the swing angle θ=0° and setting the Y-axis positive direction as the swing angle θ=90°. Then, the swing angle data Dg is updated using the calculated swing angle θ.

Next, the CPU 10 sets a swing type of the swing angle θ calculated at the above step 87, by using the swing angle determination ranges for the respective swing types, which are indicated by the swing determination range data Dh (step 88). Then the processing proceeds to the next step.

For example, as shown in FIG. 19, a swing angle determination range for a "flat shot", a swing angle determination range for a "topspin shot", a swing angle determination range for a "lob shot", a swing angle determination range for a "slice spin shot", and a swing angle determination range for a "drop shot" are set in the swing determination range data Dh. To be specific, the swing angle determination range for a "flat shot" is set to include swing angles θ that are −22.5° to 22.5°, 165° to 180° and −165° to −180°; the swing angle determination range for a "topspin shot" is set to include swing angles θ that are 22.5° to 70° and 110° to 165°; the swing angle determination range for a "lob shots" is set to include swing angles θ that are 70° to 110°; the swing angle determination range for a "slice spin shot" is set to include swing angles θ that are −22.5° to −60° and −120° to −165°; and the swing angle determination range for a "drop shot" is set to include swing angles θ that are −60° to −120°.

Then, the CPU 10 determines which one of the above swing angle determination ranges includes the swing angle θ calculated at the above step 87. Then, a swing type having the determined swing angle determination range is selected, and the swing type data Di is updated using the selected swing type. Here, when the player holding the controller 7 with the right hand (i.e., right-handed) performs a swing whose angle θ is within 90° to 180° or −90° to −180°, a swing type determination for a case where the player swings the controller 7 on forehand is performed. Whereas, when the player holding the controller 7 with the right hand performs a swing whose angle θ is within −90° to 90°, a swing type determination for a case where the player swings the controller 7 on backhand is performed.

Return to FIG. 18. The CPU 10 determines whether or not the swing type set at the above step 88 is a "topspin shot" and the swing angle θ calculated at the above step 87 is within 54° to 126° (step 89). When the swing type is a "topspin shot" and the swing angle θ is within 54° to 126°, the CPU 10 proceeds to a process at the next step 90. On the other hand, when the swing type is not a "topspin shot" or the swing angle θ is not within 54° to 126°, the CPU 10 proceeds to a process at the next step 92.

At step 90, the CPU 10 determines whether or not a value of the Z-axis component of the vector sum contained in the vector sum data De is less than the threshold Tb. Here, the threshold Tb is a value used for determining, based on acceleration occurring in the Z-axis direction, whether the player has swung the controller 7 to hit a "lob shot" or to hit a "topspin shot". For example, the threshold Tb is set such that Tb=9.3G. Then, when the value of the Z-axis component of the vector sum is less than the threshold Tb, the CPU 10 proceeds to a process at the next step 91. Whereas, when the value of the Z-axis component of the vector sum is no less than the threshold Tb, the CPU 10 proceeds to a process at the next step 92.

Note that, since the Z-axis component of the vector sum resulting from adding (summing) up five acceleration vectors is used at the above step 90, the Z-axis component is a value resulting from summing up five Z-axis components of the acceleration vectors. Therefore, the threshold Tb needs to be set to a relatively large value in consideration of the summed value. However, the determination at the above step 90 may be performed in a different manner. As a first example, a mean value of the Z-axis components of the five acceleration vectors is used. In this Case, the threshold Tb is 9.3G/5=1.86G, for example. As a second example, the value of the Z-axis component of an acceleration vector selected from the five acceleration vectors (e.g., the history h0 or h4) is used. In this case also, the threshold Tb is 9.3G/5=1.86G, for example.

At step 91, the CPU 10 changes the swing type from "topspin shot" to "lob shot", and updates the swing type data Di. Then, the processing proceeds to the next step 92. Hereinafter, the processes at the above steps 89 to 91 will be described in further detail.

Figure 20:
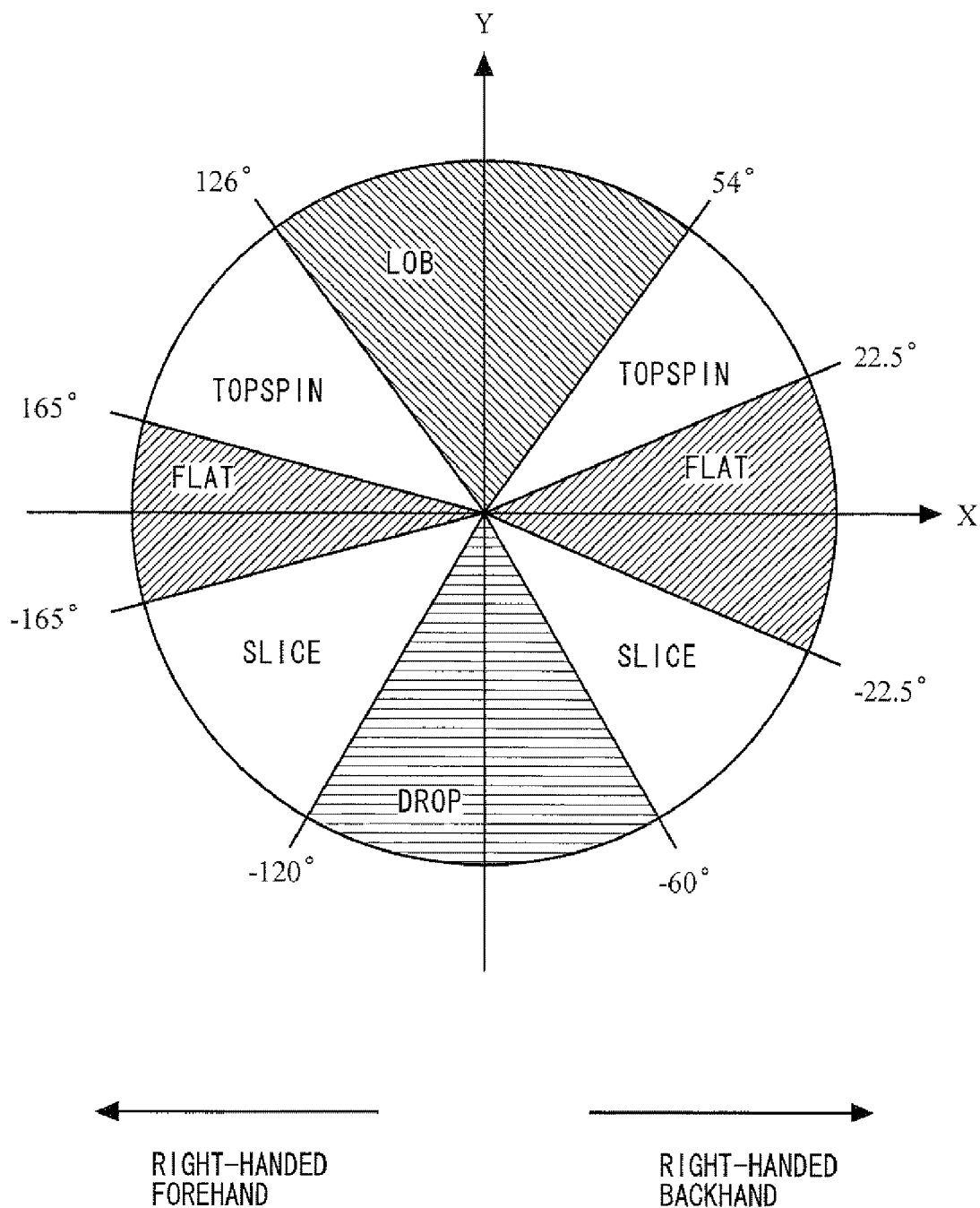
FIG. 20 shows an example of swing angle determination ranges, in which the determination ranges are changed in the swing determination process.

In the processes at the above steps 89 to 91, the swing angle determination ranges, at least partly, change in accordance with the value of the Z-axis component of the vector sum. For example, as shown in FIG. 19, the swing angle determination ranges indicated by the swing determination range data Dh are set such that the swing angle determination range for a "topspin shot" is set to include swing angles θ that are 22.5° to 70° and 110° to 165°, and the swing angle determination range for a "lob shot" is set to include swing angles θ that are 70° to 110°. However, when the value of the Z-axis component of the vector sum is equal to or greater than the threshold Tb, the swing angle determination range for the determination of a "lob shot" is expanded and changed. To be specific, as shown in FIG. 20, when the value of the Z-axis component of the vector sum is equal to or greater than the threshold Tb, the swing angle determination range for a "topspin shot" is reduced to only include swing angles θ that are 22.5° to 54° and 126° to 165°. Also, when the value of the Z-axis component of the vector sum is equal to or greater than the threshold Tb, the swing angle determination range for a "lob shot" is expanded to include the swing angles θ that are 54° to 126°.

Figure 22:
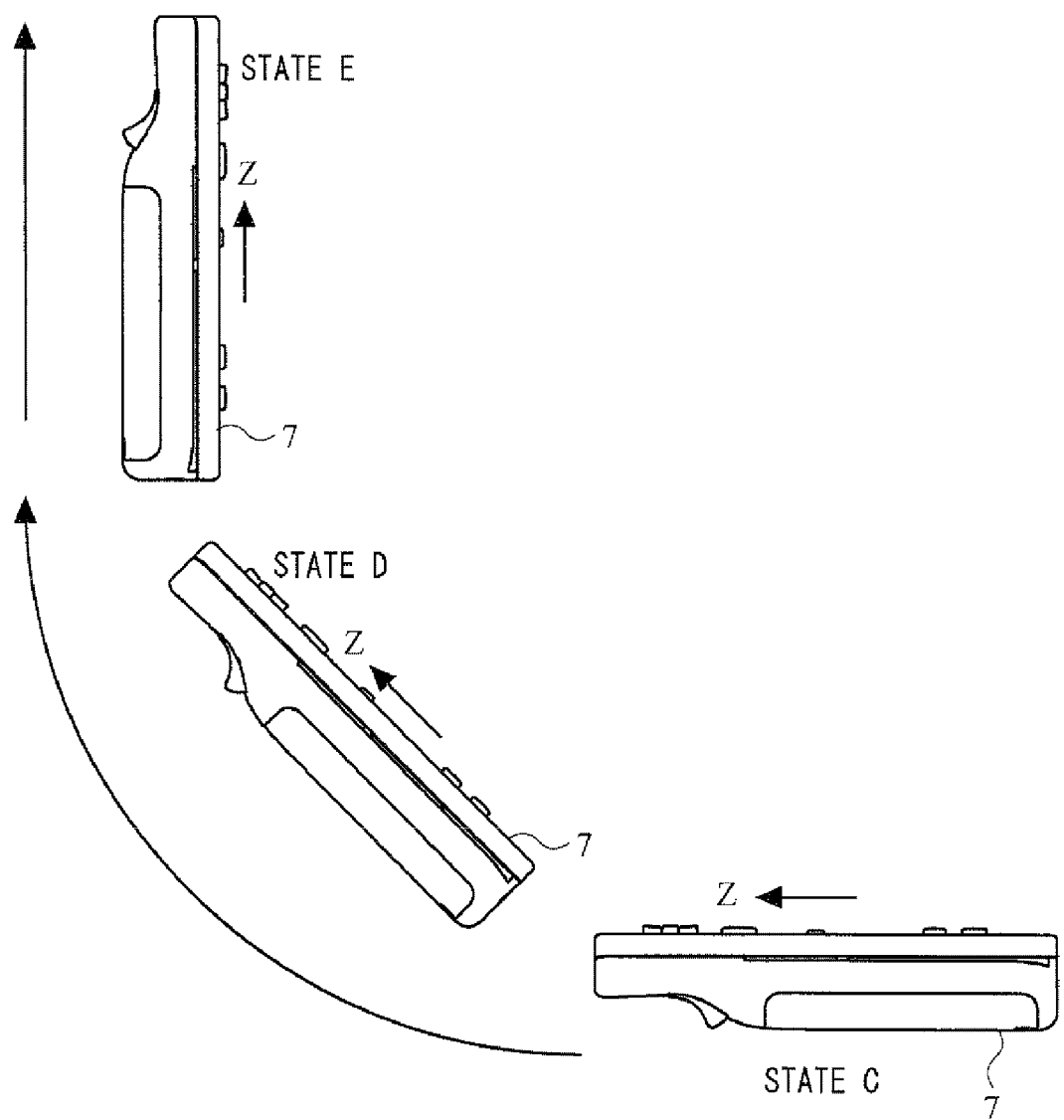
FIG. 22 shows another example of a change in a state of the controller 7 from a state where the upper surface of the controller 7 faces upward to a state where the front surface of the controller 7 faces upward.

Considered here is a change in a state, which change occurs when the player hits a "topspin shot" or "lob shot", of the controller 7 from a state where the top surface of the controller 7 faces upward to a state where the front surface of the controller 7 faces upward. When the player swings the controller 7 to hit a "topspin shot" as shown in FIG. 21, the controller 7 rotates with respect to a particular rotation axis so as to move in the Y-axis positive direction. Accordingly, a motion in the Z-axis positive direction is relatively small. Therefore, centrifugal force in the Z-axis positive direction and acceleration in the Y-axis positive direction are mainly exerted on the controller 7. Whereas when the player swings the controller 7 to hit a "lob shot" as shown in FIG. 22, the controller 7 greatly rotates with respect to a particular rotation axis while moving in the Z-axis positive direction. Accordingly, a motion in the Z-axis positive direction is relatively large, and acceleration in the Z-axis positive direction is exerted on the controller 7. In other words, the acceleration, which occurs due to the motion in the Z-axis positive direction, is exerted in such a direction as to negate the centrifugal force that occurs in the Z-axis positive direction. Consequently, the acceleration occurring in the Z-axis positive direction in the case of a "lob shot" is smaller than in the case of a "topspin shot". Moreover, the player tends to swing the controller 7 more strongly in the case of hitting a "topspin shot" than in the case of hitting a "lob shot". Also for this reason, the acceleration occurring in the Z-axis positive direction is smaller in the case of a "lob shot". Based on such tendency for the player's swing, the swing angle determination ranges are, at least partly, changed by the processes at the above steps 89 to 91.

The swing angle θ and the swing type are determined based on the swing angle determination ranges by using the X- and Y-axis components of an acceleration vector. The Z-axis component of the same acceleration vector is used as a value for changing the swing angle determination ranges Accordingly, in the processes at the above steps 89 to 91, the swing angle determination ranges, with which the swing type is determined using the components of the two axes (X-axis, Y-axis) of the three-axis (X-axis, Y-axis, Z-axis) acceleration vector obtained from the acceleration sensor 701, are changed based on the value of the component of the one axis (Z-axis) that is different from the above two axes.

Return to FIG. 18. At step 92, the CPU 10 sets the swing determination flag SWfrg contained in the swing determination flag data Dc to OFF. Then, the processing of the subroutine ends.

Thus, in the above-described game processing, the swing angle determination ranges, with which the swing type is determined using the components of the two axes (X-axis, Y-axis) of the three-axis (X-axis, Y-axis, Z-axis) acceleration vector obtained from the acceleration sensor 701, are changed based on the value of the component of the one axis (Z-axis) that is different from the above two axes. As a result, even if swing operations are performed with a same swing direction, the swing operations can be determined to be different from each other based on a swing manner, swing strength or the like. Therefore, more detailed determination can be provided. Consequently, the game processing, which is properly based on operations intended by the player, is realized.

Note that, in the above-described manner of changing the swing angle determination ranges, steps 88 to 91 (see FIG. 18) show the procedure of setting the swing type and then resetting the swing type for a vector sum that satisfies a particular condition. However, the swing angle determination ranges may be changed in a different manner. For example, prior to setting the swing type at step 88, step 90 is performed, and when the value of the Z-axis component of the vector sum is equal to or greater than the threshold Tb, the swing angle determination ranges shown in FIG. 19 are used to set the swing type. Whereas, if the value of the Z-axis component of the vector sum is less than the threshold Tb when step 90 is performed prior to setting the swing type at step 88, the swing angle determination ranges shown in FIG. 20 are used to set the swing type. Thus, the swing angle determination ranges may be changed in the above manner in which two types of swing angle determination ranges are separately used in accordance with the value of the Z-axis component of the vector sum.

The above-described swing angle determination ranges are merely examples. It is understood that different swing angle determination ranges can be set. Although the swing angle determination ranges shown in FIGS. 19 and 20 are set such that the determination can be performed only based on the direction of the vector sum. However, for example, additional determination ranges may be set such that the determination can be performed also based on a magnitude of the vector sum. For instance, swing angle determination ranges in the case where a magnitude of the vector sum is less than a predetermined value, and swing angle determination ranges in the case where the magnitude of the vector sum is no less than the predetermined value, may be set to be different from each other. To be specific, it is conceivable to set the swing angle determination ranges such that in the case where the magnitude of the vector sum is less than the predetermined value, the swing type is determined to be the same (e.g., a volley) regardless of the direction of the vector sum (i.e., regardless of the swing angle θ).

As another example, the swing angle determination ranges may be set such that the swing type is determined to be a different shot depending on a game situation. Specifically, when the player swings the controller 7 downward from top to bottom, the swing angle determination ranges shown in FIG. 19 or 20 determine the swing to be a "drop shot" in the tennis game. However, when the player swings the controller 7 downward from top to bottom, the swing type may be determined to be a "smash shot" instead of a "drop shot", depending on a situation of the tennis game. For example, the swing type is determined to be a "smash shot" when the player swings the controller 7 downward from top to bottom in response to the opponent character EC hitting a lob shot such that, for example, the ball character BC drops near the net.

Figure 23:
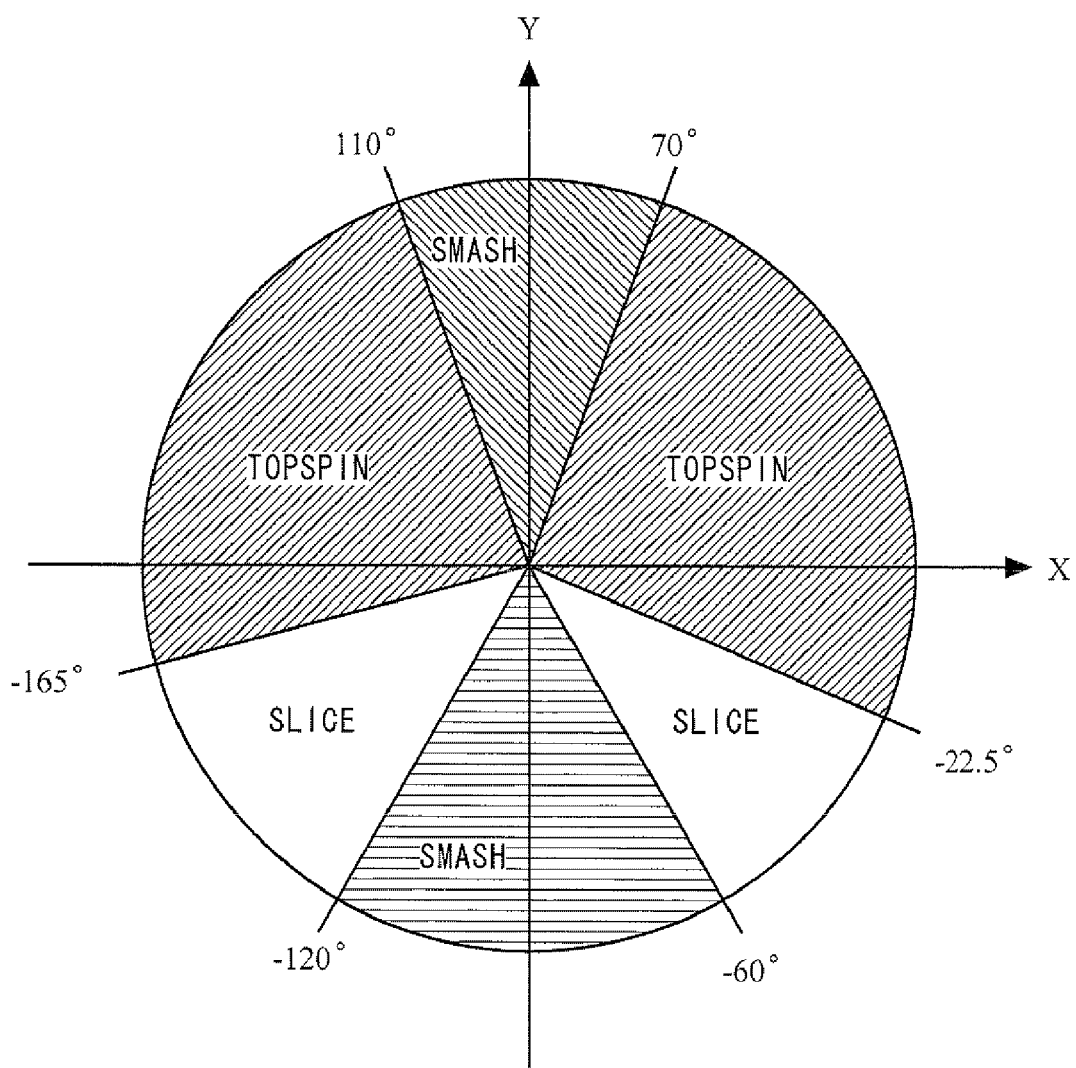
FIG. 23 shows an example of swing angle determination ranges for determining a service, which are used in the swing determination process.

Further, when the player character PC delivers a serve, swing angle determination ranges different from the above-described swing angle determination ranges may be set. For example, as shown in FIG. 23, when the player character delivers a serve, a swing angle determination range for a "topspin serve", a swing angle determination range for a "slice spin serve", and a swing angle determination range for a "smash serve" are set, respectively. To be specific, the swing angle determination range for a "topspin serve" is set to include swing angles G that are $-22.5°$ to $70°$, $110°$ to $180°$ and $-165°$ to $-180°$; the swing angle determination range for a "slice spin serve" is set to include swing angles θ that are $-22.5°$ to $-60°$ and $-120°$ to $-165°$; and the swing angle determination range for a "smash serve" is set to include swing angles θ that are $70°$ to $110°$ and $-60°$ to $-120°$. Here, a "smash serve" is a special serve in the game, which is faster and stronger as compared to other types of serve. In the swing angle determination ranges for a service as shown in FIG. 23, the swing type is set to be a "smash serve" when the player swings the controller 7 downward from top to bottom or when the player swings the controller 7 upward from bottom to top. Basically, when the player swings the controller 7 downward from top to bottom, the swing type is determined to be a "smash serve". However, there is a case where when the player stops swinging down the controller 7 before the swing type is set, acceleration in the opposite direction occurs. For this reason, the swing angle determination range from $70°$ to $110°$ is set so as to detect such acceleration and determine the swing type to be a "smash serve".

In the above game processing, the determination ranges (swing angle determination ranges), with which one of a plurality of game processes (swing types) is selected using the components of the two axes (X-axis, Y-axis) of the three-axis (X-axis, Y-axis, Z-axis) acceleration vector obtained from the acceleration sensor 701, are changed based on the value of the component of the one axis (Z-axis) that is different from the above two axes. However, the determination ranges may be changed in a different manner. As a first example, determination ranges, with which one of a plurality of game processes is selected using a component or components of one or two axes of the three-axis acceleration vector obtained from the acceleration sensor 701, may be changed based on values of components of the three axes. As a second example, determination ranges, with which one of a plurality of game processes is selected using a component of one axis of the three-axis acceleration vector obtained from the acceleration sensor 701, may be changed based on a value of a component of another axis that is different from the one axis. In this case, the acceleration sensor 701 may be structured as an accelerometer that detects linear acceleration at least along two axis directions. In the above first and second examples, the determination ranges for performing determination using a component of one of the three axes are set so as to determine a direction or magnitude of acceleration of the component. As a third example, determination ranges, with which one of a plurality of game processes is selected using a component of one axis of the three-axis acceleration vector obtained from the acceleration sensor 701, may be changed based on values of components of the other two axes that are different from the one axis.

It is assumed in the above description of the game processing that the player holds and operates the controller 7 while maintaining a state where the top surface of the controller 7 faces upward. In other words, it is assumed that the gravitational acceleration in the Y-axis negative direction is exerted on the controller 7. The game processing may be performed using the gravitational acceleration actually exerted on the controller 7, by additionally performing, during the game processing, a process of detecting a direction of the gravitational acceleration exerted on the controller 7. For example, a static state of the controller 7 is arbitrarily detected, and a direction and a magnitude of acceleration applied to the controller 7 in such state are set as a direction and a magnitude of the gravitational acceleration exerted on the controller 7. To be specific, the controller 7 can be determined to be in a static state by, for example, detecting that a period, during which a change in acceleration data outputted from the acceleration sensor 701 stays in a predetermined range (e.g., a predetermined range having 1G as a center thereof), has lasted as long as or longer than a predetermined time. Then, at the above-described step 84, the arbitrarily set gravitational acceleration is used to eliminate gravity components from the respective acceleration vectors. Further, at the above-described step 87, the arbitrarily set gravitational acceleration is used as a reference for the calculation of the swing angle θ. For example, at step 87, the direction defined by the X- and Y-axis components of the vector sum is corrected such that the direction of the arbitrarily set gravitational acceleration becomes the Y-axis negative direction, and then the corrected direction of the X- and Y-axis components of the vector sum is used to calculate the swing angle θ.

Further, the above-described game processing uses a history of accelerations in the swing determination process. To be specific, the swing determination process is performed using a history of accelerations detected by processing performed five times, the accelerations including an acceleration used for determining whether or not the player has swung the controller 7. In other words, in the above-described game processing, the swing determination process is performed based on acceleration data that is obtained during a predetermined period that starts when a magnitude of acceleration applied to the controller 7 has reached a predetermined value. However, used in the swing determination process may be a history of accelerations obtained during a different period. As a first example, the swing determination process may be performed based on acceleration data that is obtained during a predetermined period that includes periods prior, at and subsequent to a point when a magnitude of acceleration applied to the controller 7 reaches a predetermined value. As a second example, the swing determination process may be performed based on acceleration data that is obtained during a predetermined period that ends when a magnitude of acceleration applied to the controller 7 has reached a predetermined value. As a third example, the swing determination process may be performed based on acceleration data that is obtained during a predetermined period that starts when a predetermined time has passed after a magnitude of acceleration applied to the controller 7 has reached a predetermined value.

Still further, although the above description of the game processing gives an example where the present invention is used for the swing determination process in the tennis game, the present invention may be used for such an acceleration data determination process performed in a different game.

As a first example, in a player-versus-player game in which players fight against each other by using swords or the like, the acceleration data determination process of the present invention can be used in relation to an action of swinging a sword. To be specific, a player holding the controller 7 performs such actions as swinging a sword to attack an opponent or using the sword for defense. Here, a conceivable process to which the present invention is applicable is a process of determining, based on a direction in which the controller 7 is swung or moved during an attack/defense motion (i.e., based on X- and Y-axis components), the direction of the swing by the player or a defense pose. In this case, determination ranges for the X- and Y-axis components are set such that, when acceleration occurring in the Z-axis positive direction of the controller 7 is relatively large, there is a high possibility of determining that an attack by swinging the sword has been performed. Also, the determination ranges for the X- and Y-axis components are set such that, when acceleration occurring in the Z-axis positive direction of the controller 7 is relatively small, there is a high possibility of determining that a defense using the sword has been performed. To be specific, if centrifugal force applied to the controller 7 when the player swings the controller 7 upward from bottom to top is relatively large, it is determined that an attack by swinging the sword upward from bottom to top has been performed. Whereas, if the centrifugal force applied to the controller 7 is relatively small, it is determined that the player has adopted such a pose as to raise the sword to protect his/her head.

As a second example, the acceleration data determination process of the present invention can be used in relation to a pitching action in a baseball game. To be specific, a player holding the controller 7 makes a baseball pitcher's motion to throw a ball. Here, a conceivable process to which the present invention is applicable is a process of determining a type of pitch thrown by the player, based on a direction in which the controller 7 is swung during a pitching motion (i.e., based on X- and Y-axis components) In this case, determination ranges for the X- and Y-axis components are set such that, when acceleration occurring in the Z-axis positive direction of the controller 7 is relatively large, there is a high possibility of determining that the pitch is a straight ball. Also, the determination ranges For the X and Y-axis components are set such that, when acceleration occurring in the Z-axis positive direction of the controller 7 is relatively small, there is a high possibility of determining that the pitch is a breaking ball.

Still further, the above description describes a tennis game in which a swing type is determined and then used to cause the player character PC in a three-dimensional virtual game space to hit a ball. However, it is understood that the present invention is applicable to other types of games. As a first example, the present invention is applicable to a game using a two-dimensional virtual game world in which a tennis court is placed and a player character PC hits a ball.

Still further, although the above description describes an example in which the present Invention is applied to a stationary game apparatus, the present invention is also applicable to general information processing apparatuses that are operated with an input device having an acceleration sensor therein, for example, personal computers. Such an information processing apparatus can be enabled to perform various game processes based on acceleration applied to the input device, for example, a process of calculating, based on acceleration data outputted from the acceleration sensor of the input device, a direction in which a user holding the input device has swung the input device.

Still further, in the above description, the controller 7 and the game apparatus body 5 are connected by radio communication. However, the controller 7 and the game apparatus body 5 may be electrically connected by a cable. In this case, the cable connected to the controller 7 is connected to a connecting terminal of the game apparatus body 5.

The shape of the controller 7, the shapes and the number of the operation sections 72 mounted thereon, the positions in which the operation sections 72 are provided, and the like in the above description are merely examples. It is understood that the present invention can be realized even if these shapes, numbers, positions and the like are different from the above description. Further, coefficients, values for determination, equations, processing order and the like used in the above-described processing are merely examples. It is understood that the present invention can be realized even with different values, equations, processing order and the like.

The game program of the present invention maybe supplied to the game apparatus body 5 not only via an external storage medium such as the optical disc 4, but also via a wired or wireless communication path. Further, the game program may be prestored in a non-volatile storage device provided within the game apparatus body 5. Note that, an information storage medium for storing the game program may be a CD-RON, DVD or other similar optical disc storage medium, or may be a nonvolatile semiconductor memory.

While the invention has been described in detail, the foregoing description is in all aspects illustrative and not restrictive. It is understood that numerous other modifications and variations can be devised without departing from the scope of the present invention.

The game apparatus and the storage medium storing the game program, according to the present invention, are capable of selecting and performing appropriate game processing in a game where game processing is performed based on acceleration, and are useful as a game apparatus and a game program which execute, e.g., a game in which processing is performed based on input-device-swinging operations.

What is claimed is:

1. A game apparatus performing game processing by using acceleration data outputted from an acceleration sensor that is capable of detecting acceleration in directions of at least two axes with respect to an input device, the game apparatus comprising:
   an obtaining unit that obtains the acceleration data from the input device;
   a range setting unit that sets, in order to determine first acceleration relating to at least one axis among the at least two axes, a plurality of determination ranges for the first acceleration;
   a range control unit that changes, by using the acceleration data, at least one of the plurality of determination ranges in accordance with second acceleration relating to at least one axis among the at least two axes, the at least one axis including at least a different axis from the at least one axis relating to the first acceleration;
   a determination unit that determines which of the plurality of determination ranges includes the first acceleration indicated by the acceleration data; and
   a game processing unit that performs game processing in accordance with a determination result provided by the determination unit.

2. The game apparatus according to claim 1, wherein
   the acceleration sensor detects acceleration in directions of three axes with respect to the input device,
   the first acceleration relates to two axes among the three axes,
   the second acceleration relates to a remaining one of the three axes, which is different from the two axes, and
   when the first acceleration is a two-dimensional vector relating to the two axes, the range setting unit sets the plurality of determination ranges with respect to a direction of the two-dimensional vector.

3. The game apparatus according to claim 2, wherein when acceleration relating to the remaining one axis, which acceleration is indicated by the acceleration data, is less than a predetermined value, the range control unit significantly changes at least one of the plurality of determination ranges.

4. The game apparatus according to claim 3, wherein
   the range setting unit sets the plurality of determination ranges respectively for operation descriptions that are set so as to respectively correspond to directions in which the input device is swung,
   the game processing unit executes, as the game processing, a tennis game in which a player character appearing in a virtual game world is caused to perform swings in accordance with the operation descriptions,
   the range setting unit sets the plurality of determination ranges such that when the input device is swung in an upward direction, one of the operation descriptions, which corresponds to the swing, is a lob shot for hitting a ball relatively high in the tennis game, and
   when the acceleration relating to the remaining one axis, which is indicated by the acceleration data, is less than the predetermined value, the range control unit significantly changes one of the plurality of determination ranges, which is set for the one of the operation descriptions, which indicates the lob shot.

5. The game apparatus according to claim 1, further comprising a motion detection unit that detects a time point at which acceleration, which is indicated by the acceleration data and which relates to at least one axis among the at least two axes, has become a value equal to or greater than a predetermined value, wherein
   the determination unit performs determination on the first acceleration, by using a history of the acceleration data obtained during a predetermined period that is set with reference to the time point detected by the motion detection unit.

6. The game apparatus according to claim 1, wherein in response to the determination result provided by the determination unit, the game processing unit selects and performs, from among a plurality of types of game processing, one type of game processing that is set corresponding to one of the plurality of determination ranges, which includes the first acceleration.

7. The game apparatus according to claim 6, wherein
   the range setting unit sets the plurality of determination ranges respectively for operation descriptions that are set so as to respectively correspond to motions of the input device, and
   the game processing unit performs game processing in accordance with one of the operation descriptions, which is set corresponding to one of the plurality of determination ranges, which includes the first acceleration.

8. The game apparatus according to claim 7, wherein the game processing unit performs game processing that causes a player character appearing in a virtual game world to perform a swing in accordance with the one of the operation descriptions.

9. The game apparatus according to claim 1, wherein
the determination unit recognizes a direction, in which the first acceleration has occurred, to be a direction in which the input device has moved, and determines one of the plurality of determination ranges, which includes the direction,
the range setting unit sets the plurality of determination ranges respectively for operation descriptions that are set so as to respectively correspond to moving directions of the input device, and
when a magnitude of the second acceleration is less than a predetermined value, the range control unit significantly changes at least one of the plurality of determination ranges.

10. A non-transitory computer-readable storage medium storing a game program to be executed by a computer of a game apparatus that performs game processing by using acceleration data outputted from an acceleration sensor that is capable of detecting acceleration in directions of at least two axes with respect to an input device, the game program causing the computer to execute:
obtaining the acceleration data from the input device;
setting, in order to determine first acceleration relating to at least one axis among the at least two axes, a plurality of determination ranges for the first acceleration;
changing, by using the acceleration data, at least one of the plurality of determination ranges in accordance with second acceleration relating to at least one axis among the at least two axes, the at least one axis including at least a different axis from the at least one axis relating to the first acceleration;
determining which of the plurality of determination ranges includes the first acceleration indicated by the acceleration data; and
performing game processing in accordance with a determination result provided by the determining.

11. The non-transitory computer-readable storage medium storing the game program, according to claim 10, wherein
the acceleration sensor detects acceleration in directions of three axes with respect to the input device,
the first acceleration relates to two axes among the three axes,
the second acceleration relates to a remaining one of the three axes, which is different from the two axes, and
when the first acceleration is a two-dimensional vector relating to the two axes, the plurality of determination ranges is set with respect to a direction of the two-dimensional vector.

12. The non-transitory computer-readable storage medium storing the game program, according to claim 11, wherein when acceleration relating to the remaining one axis, which acceleration is indicated by the acceleration data, is smaller than a predetermined value, at least one of the plurality of determination ranges is significantly changed.

13. The non-transitory computer-readable storage medium storing the game program, according to claim 12, wherein
the plurality of determination ranges are set respectively for operation descriptions that are set so as to respectively correspond to directions in which the input device is swung,
a tennis game is executed, as the game processing, in which a player character appearing in a virtual game world is caused to perform swings in accordance with the operation descriptions,
the plurality of determination ranges are set such that when the input device is swung in an upward direction, one of the operation descriptions, which corresponds to the swing, is a lob shot for hitting a ball relatively high in the tennis game, and
when the acceleration relating to the remaining one axis, which is indicated by the acceleration data, is less than the predetermined value, one of the plurality of determination ranges, which is set for the one of the operation descriptions, which indicates the lob shot is significantly changed.

14. The non-transitory computer-readable storage medium storing the game program, according to claim 10, wherein the game program further causes the computer to execute:
detecting a time point at which acceleration, which is indicated by the acceleration data and which relates to at least one of the at least two axes, has become a value equal to or greater than a predetermined value; and
performing determination on the first acceleration, by using a history of the acceleration data obtained during a predetermined period that is set with reference to the detected time point.

15. The non-transitory computer-readable storage medium storing the game program, according to claim 10, wherein in response to the determination result one type of game processing, from among a plurality of types of game processing, that is set corresponding to one of the plurality of determination ranges, which includes the first acceleration is selected and performed.

16. The non-transitory computer-readable storage medium storing the game program, according to claim 15, wherein
the plurality of determination ranges are set respectively for operation descriptions that are set so as to respectively correspond to motions of the input device, and
game processing is performed in accordance with one of the operation descriptions, which is set corresponding to one of the plurality of determination ranges, which includes the first acceleration.

17. The non-transitory computer-readable storage medium storing the game program, according to claim 16, wherein game processing that causes a player character appearing in a virtual game world to perform a swing in accordance with the one of the operation descriptions is performed.

18. The non-transitory computer-readable storage medium storing the game program, according to claim 10, wherein
a direction, in which the first acceleration has occurred, is recognized to be a direction in which the input device has moved, and one of the plurality of determination ranges, which includes the direction is determined,
the plurality of determination ranges are set respectively for operation descriptions that are set so as to respectively correspond to moving directions of the input device, and
when a magnitude of the second acceleration is less than a predetermined value, at least one of the plurality of determination ranges is significantly changed.

* * * * *